United States Patent
Nitsuma et al.

(10) Patent No.: US 12,034,492 B2
(45) Date of Patent: Jul. 9, 2024

(54) SIGNAL ANALYSIS DEVICE AND SIGNAL ANALYSIS RESULT DISPLAY METHOD

(71) Applicant: ANRITSU CORPORATION, Kanagawa (JP)

(72) Inventors: Yuki Nitsuma, Kanagawa (JP); Takaaki Kamisawa, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/560,891

(22) Filed: Dec. 23, 2021

(65) Prior Publication Data

US 2022/0303026 A1 Sep. 22, 2022

(30) Foreign Application Priority Data

Mar. 17, 2021 (JP) .................... 2021-044117

(51) Int. Cl.
*H04B 17/00* (2015.01)
(52) U.S. Cl.
CPC ................ *H04B 17/0085* (2013.01)
(58) Field of Classification Search
CPC . H04B 17/0085; H04B 17/23; H04B 17/3912
See application file for complete search history.

(56) References Cited

U.S. PATENT DOCUMENTS

| | | | | |
|---|---|---|---|---|
| 2008/0151772 A1* | 6/2008 | Akita | ............... | H04B 17/23 370/252 |
| 2011/0149749 A1* | 6/2011 | Ogata | ............... | H04L 5/003 370/252 |
| 2012/0212492 A1* | 8/2012 | Inoue | ............... | H04B 17/23 370/252 |
| 2013/0163653 A1* | 6/2013 | Hirschmann | ....... | H04L 27/2602 375/224 |

(Continued)

FOREIGN PATENT DOCUMENTS

JP 2007-104294 A 4/2007

OTHER PUBLICATIONS

Rohde Schwartz—Demystifying 5G—How to generate and analyze 5G NR TDD signals, https://www.youtube.com/watch?v=u9QYFAgQcOI (website video is available for review as of the date of citation on YouTube—dated Jul. 2, 2019. Screen captures from video uploaded as PDF (ROHDE_1.pdf )) (Year: 2019).*

(Continued)

*Primary Examiner* — Edan Orgad
*Assistant Examiner* — Malick A Sohrab
(74) *Attorney, Agent, or Firm* — Pearne & Gordon LLP

(57) ABSTRACT

The base station simulator 10 as a signal analysis device performs communication with a UE 70 by simulating a base station to test an operation of a communication function of the UE 70, and includes a reception unit 21*a* that receives a signal to be measured modulated by an OFDM method, transmitted from the UE 70, an analog signal processing unit (Continued)

22 that calculates signal data of the signal to be measured received by the reception unit 21*a*, a data analysis unit 27*c* that analyzes the signal data for a predetermined analysis item for each time domain defined by the OFDM method, and calculates analysis results of a plurality of analysis items corresponding to each time domain, and an analysis result display unit 28*c* that displays the analysis results of the plurality of analysis items side by side.

15 Claims, 12 Drawing Sheets

(56) References Cited

U.S. PATENT DOCUMENTS

2014/0233623 A1* 8/2014 Suenaga ............ H04L 27/2601
375/224

OTHER PUBLICATIONS

Rohde Schwartz—5G NR Signal Generation and Analysis, https://www.youtube.com/watch?v=ho149uBL3Ow (website video is avail able for review as of the date of citation on YouTube—dated Aug. 30, 2019. Screen captures from video uploaded as PDF (ROHDE_2.pdf )) (Year: 2019).* http://web.archive.org/web/20200807092430/https://www.artizanetworks.com/resources/tutorials/ofdma.html (Year: 2020).* https://web.archive.org/web/20190613084835/http://www.rfwireless-world.com/5G/5G-NR-Frame-Structure.html (Year: 2019).*

Rohde Schwartz—Rohde & Schwarz SMW FSW 5GNR 4x100MHz 4CC signal generation and analysis in band n261, https://www.youtube.com/watch?v=mQVw6NoxcqY referenced hereafter as i.e. "Rohde" (website video is available for review as of the date of citation on YouTube—dated Oct. 7, 2020 (Year: 2020).*

ETSI TS 136 521-1 V12.5.0 (May 2015)—LTE; Evolved Universal Terrestrial Radio Access (E-UTRA); User Equipment (UE) conformance specification; Radio transmission and reception; Part 1: Conformance testing (3GPP TS 36.521-1 version 12.5.0 Release 12) (Year: 2015).*

Agilent Technologies—Agilent PXT Wireless Communications Test Set—Users Guide (E6621A) (Year: 2013).*

* cited by examiner

SIGNAL ANALYSIS DEVICE AND SIGNAL ANALYSIS RESULT DISPLAY METHOD

TECHNICAL FIELD

The present invention relates to a signal analysis device having a function of receiving and analyzing a signal to be measured transmitted from a mobile terminal when testing the mobile terminal by simulating a base station, and displaying the analysis result, and a signal analysis result display method.

BACKGROUND ART

For example, in a mobile phone system, with the multi-functionalization of mobile terminals, the speed of wireless communication between the mobile terminals and a wireless base station (hereinafter referred to as a base station) has been increased. In recent years, for example, technological development for shifting from 4th generation (4G) services that employ the LTE-Advanced method or the like to 5th generation (5G) services is progressing.

Against this background, new models of mobile communication terminals (hereinafter referred to as mobile terminals) such as mobile phones have been developed one after another, and it is necessary to test whether or not the newly developed mobile terminals operate normally.

As a device used for testing a mobile terminal, for example, a modulation signal analysis device having a function of receiving a modulation signal to be analyzed from a pseudo base station to the mobile terminal to be tested, executing signal analysis of each analysis item designated in advance by the operator is executed, and displaying the analysis result of each analysis item on a display unit has been known in the related art (for example, Patent Document 1 and the like).

RELATED ART DOCUMENT

Patent Document

[Patent Document 1] JP-A-2007-104294

DISCLOSURE OF THE INVENTION

Problem that the Invention is to Solve

In the modulation signal analysis device described in Patent Document 1, for example, when modulation accuracy (EVM) is designated as an analysis item, the analysis result of EVM and the determination result of abnormality determination of EVM are displayed at the same time (Paragraph 0056). As an example, as the "EVM measurement result", there is an example in which the maximum value and the average value of EVM and the "error" indicating that the abnormality determination result is abnormal are displayed at the same time (see FIG. 9).

According to the display control of the signal analysis result in the modulation signal analysis device described in Patent Document 1, the operator can recognize the measured value of the designated analysis item and whether the analysis item is normal or abnormal.

However, in the modulation signal analysis device described in Patent Document 1, a function of analyzing the signal data of the input modulation signal (input modulation signal) for each time domain and displaying the analysis result in association with the time domain has not been considered at all. Therefore, in the modulation signal analysis device described in Patent Document 1, it is possible to only grasp whether the designated analysis item is normal or abnormal as a whole, and there is a problem that it is difficult to specify the problematic part in detail by using the plurality of analysis results as an index, for each time domain of the signal data of the input modulation signal.

The present invention has been made to solve such a conventional problem, and an object of the present invention is to provide a signal analysis device and a signal analysis result display method capable of grasping the communication status of signal data of an input modulation signal for each time domain and specifying an abnormal part in units of time domains.

Means for Solving the Problem

In order to solve the above problems, a signal analysis device according to claim 1 of the present invention includes a reception unit (21a) that receives a signal to be measured modulated by an OFDM method, a signal data calculation unit (22) that calculates signal data of the signal to be measured received by the reception unit, an analysis unit (27c) that analyzes the signal data for a predetermined analysis item for each time domain defined by the OFDM method, and calculates a plurality of analysis results corresponding to each time domain, and a display unit (28c) that displays the plurality of analysis results side by side.

With this configuration, the signal analysis device according to claim 1 of the present invention can grasp the communication status of the signal data of the signal to be measured for each time domain, from the plurality of analysis results displayed side by side on the display unit. Further, when there is an abnormality, the abnormal part can be specified for each time domain.

In the signal analysis device according to claim 2 of the present invention, the predetermined analysis item (43b) may be further displayed on the display unit, and the signal analysis device may further include a display control unit (20d) that controls the display unit to display the plurality of analysis results (43c, 44, 45, 46) corresponding to each time domain of the predetermined analysis item, when the predetermined analysis item displayed on the display unit is selected.

With this configuration, the signal analysis device according to claim 2 of the present invention further checks a plurality of displayed analysis results for the selected analysis item, which enables to grasp the communication status of the signal to be measured for each time domain more accurate.

In the signal analysis device according to claim 3 of the present invention, the time domain may be symbols forming a predetermined slot.

With this configuration, the signal analysis device according to claim 3 of the present invention can grasp the reception status of the signal data of the signal to be measured for each symbol, and also grasps the abnormal part in units of symbols when there is an abnormality.

In the signal analysis device according to claim 4 of the present invention, the analysis unit may have a processing function of decoding the signal to be measured in units of code blocks (CBs) of symbols forming a predetermined slot, the predetermined analysis item may be a decoding result (43b) of whether the decoding is successful or unsuccessful, and the display unit may display the decoding result for each code block.

With this configuration, the signal analysis device according to claim 4 of the present invention can grasp whether or not the signal data of the signal to be measured has been successfully decoded, in units of code blocks of symbols, from a plurality of analysis results displayed side by side, and can specify the abnormal part in the code block unit of the symbol.

In the signal analysis device according to claim 5 of the present invention, the predetermined analysis item may be a constellation (41c).

With this configuration, the signal analysis device according to claim 5 of the present invention can roughly grasp the communication status of the signal data of the signal to be measured for each time domain, and can verify the communication status in more detail by further displaying the constellation in the desired time domain.

In the signal analysis device according to claim 6 of the present invention, the predetermined analysis item may be a frequency spectrum (41b).

With this configuration, the signal analysis device according to claim 6 of the present invention can roughly grasp the communication status of the signal data of the signal to be measured for each time domain, and can verify the communication status in more detail by further displaying the frequency spectrum in the desired time domain.

In the signal analysis device according to claim 7 of the present invention, the time domain may be a slot, and the display control unit may display the length of a symbol included in the slot.

With this configuration, the signal analysis device according to claim 7 of the present invention can know the length (number) of symbols constituting the signal data of the signal to be measured, and can easily grasp the communication status for each symbol.

The signal analysis device according to claim 8 of the present invention may further include a subcarrier interval setting unit (20e) that sets a frequency interval of subcarriers in the communication standard of the signal to be measured, the communication standard may be 5G NR, and the subcarrier interval setting unit may set a value of 15 KHz, 30 KHz, 60 KHz, or 120 KHz as the frequency interval of the subcarriers.

With this configuration, the signal analysis device according to claim 8 of the present invention can also support analysis of the signal data of the signal to be measured of 5G NR for each time domain, and grasp the reception status of the signal data of the signal to be measured for each time domain, even when the frequency interval of the subcarriers is either 15 KHz, 30 KHz, 60 KHz, or 120 KHz.

The signal analysis device according to claim 9 of the present invention may further include a trigger signal output unit (25) that outputs a trigger signal at a predetermined timing when a predetermined trigger condition is satisfied; and a signal extraction unit (26) that receives the trigger signal, and extracts IQ data in a predetermined section according to the predetermined timing from the signal data, in which the analysis unit may analyze signal data in the predetermined section extracted by the signal extraction unit.

With this configuration, the signal analysis device according to claim 9 of the present invention can display the analysis results side by side obtained by analyzing only the signal data in a predetermined section satisfying the trigger conditions for each time domain and a plurality of analysis items, grasp the communication status of the signal data satisfying the trigger conditions for each time domain from the plurality of analysis results displayed side by side, and also specify the abnormal part in each time domain when there is an abnormality.

In order to solve the above problems, a signal analysis result display method according to claim 10 of the present invention includes a reception step (S12) of receiving a signal to be measured modulated by an OFDM method, a signal data calculation step (S13) of calculating signal data of the signal to be measured received in the reception step, an analysis step (S19) of analyzing the signal data for a predetermined analysis item for each time domain defined by the OFDM method, and calculating a plurality of analysis results corresponding to each time domain, and a display step (S20) of displaying the plurality of analysis results on the display unit (28c) side by side.

With this configuration, the signal analysis result display method according to claim 10 of the present invention can grasp the communication status of the signal data of the signal to be measured for each time domain from the plurality of analysis results displayed side by side on the display unit, and specify the abnormal part for each time domain when there is an abnormality.

Advantage of the Invention

The present invention can provide a signal analysis device and a signal analysis result display method capable of grasping the communication status of signal data of an input modulation signal for each time domain and specifying an abnormal part in units of time domains.

BRIEF DESCRIPTION OF THE DRAWINGS

FIG. 5A is a conceptual diagram showing a timing relationship between the start and end of storage of IQ data and a trigger signal in the ring buffer memory, and FIG. 5B shows the timing of the trigger signal in the storage range of the IQ data.

BEST MODE FOR CARRYING OUT THE INVENTION

Hereinafter, embodiments of a signal analysis device and a signal analysis result display method according to the present invention will be described with reference to the drawings.

First Embodiment

In the first embodiment, an example in which a signal analysis device of the present invention is applied to a base station simulator that tests a mobile terminal by simulating a base station will be described. First, the configuration of the base station simulator in the first embodiment will be described.

Figure 1:
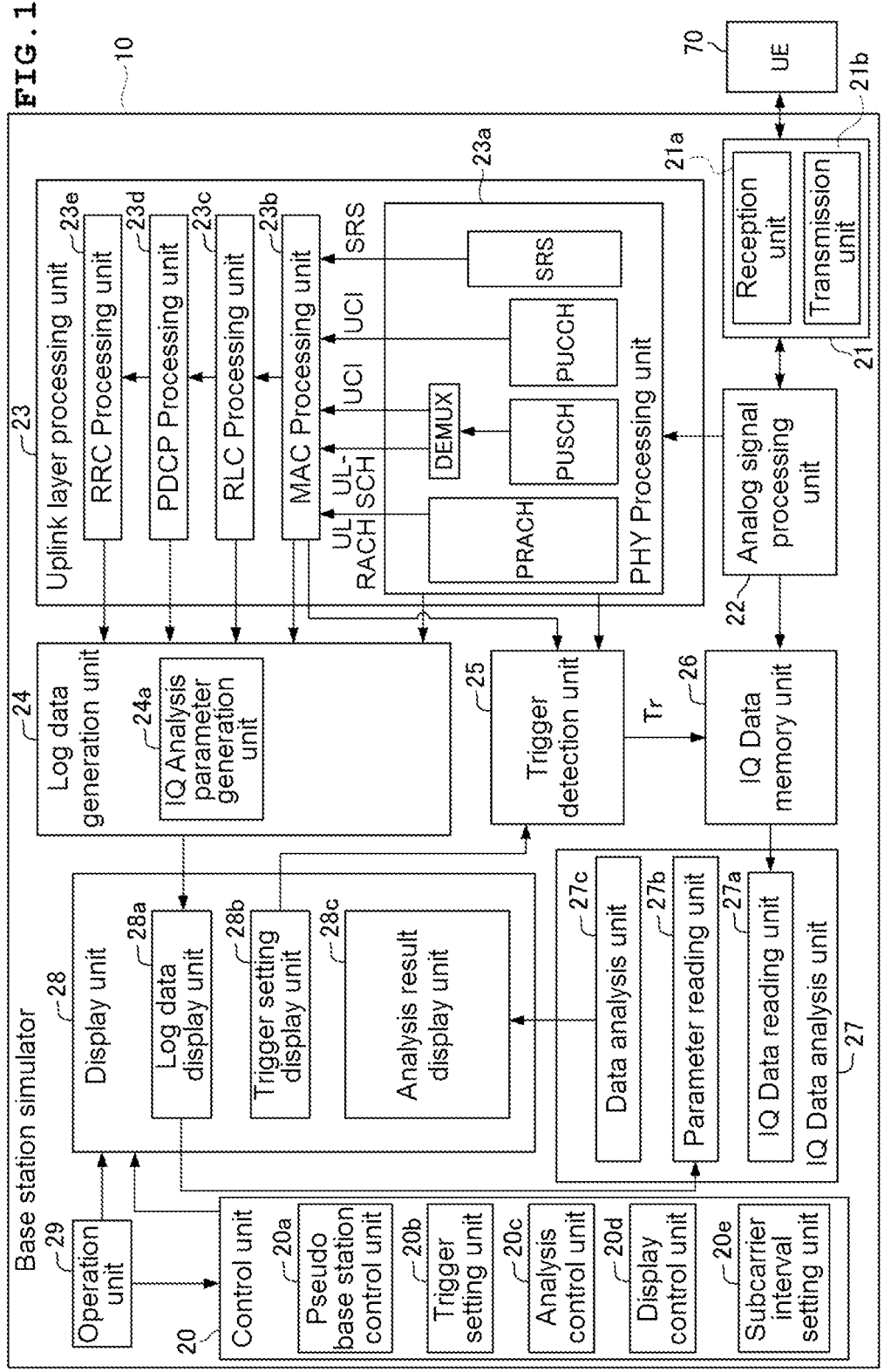
FIG. 1 is a block configuration diagram of a base station simulator according to a first embodiment of the present invention.

As shown in FIG. 1, a base station simulator 10 in the present embodiment tests the communication function of a mobile terminal (User Equipment (UE)) 70 by transmitting and receiving radio frequency signals to and from the UE 70. The UE 70 is a terminal such as a mobile phone or a mobile terminal that transmits and receives a radio frequency signal corresponding to a predetermined communication standard, for example, a communication standard called 5G NR.

The base station simulator 10 includes a control unit 20, a transmission/reception unit 21, an analog signal processing unit (signal data calculation unit) 22, an uplink layer processing unit 23, a log data generation unit 24, a trigger detection unit 25, an IQ data memory unit 26, an IQ data analysis unit 27, a display unit 28, and an operation unit 29. The base station simulator 10 includes a microcomputer (not shown) including a CPU, a ROM, a RAM, FPGA, an input/output circuit to which various interfaces are connected, and the like. That is, the base station simulator 10 causes the microcomputer to function as a base station simulator for testing the UE 70 by executing a control program stored in advance in the ROM. The base station simulator 10 constitutes the signal analysis device according to the present invention.

The control unit 20 is a function unit that controls the entire base station simulator 10, and includes a pseudo base station control unit 20a, a trigger setting unit 20b, an analysis control unit 20c, a display control unit 20d, and a subcarrier interval setting unit 20e. The pseudo base station control unit 20a is a control means for managing a plurality of pseudo base stations, transmitting a radio frequency signal simulating each pseudo base station to the UE 70 according to a preset test scenario, receiving a radio frequency signal (signal to be measured) transmitted from the UE 70 that has received the radio frequency signal, and analyzing signal data included in the signal to be measured by the IQ data analysis unit 27 to execute a test for evaluating the communication function of the UE 70. In this test, the UE 70 transmits, for example, a signal to be measured modulated by the Orthogonal Frequency Division Multiple Access (OFDM) method, and the base station simulator 10 receives the signal to be measured by the reception unit 21a, and performs the analysis process by the IQ data analysis unit 27.

The trigger setting unit 20b performs control to set a condition for instructing the acquisition (storage) timing of the signal data to be analyzed among the signal data (IQ data) calculated from the received signal to be measured. When the communication state satisfying this condition is entered, the trigger signal is output from the trigger detection unit 25 described later. The above conditions set by the trigger setting unit 20b are hereinafter referred to as trigger conditions.

The analysis control unit 20c executes analysis control for analyzing the IQ data (calculated by the analog signal processing unit 22) stored in the IQ data memory unit 26 by receiving the trigger signal. The display control unit 20d performs display control for displaying various types of information such as IQ data analysis results, on the display unit 28.

Figure 6:
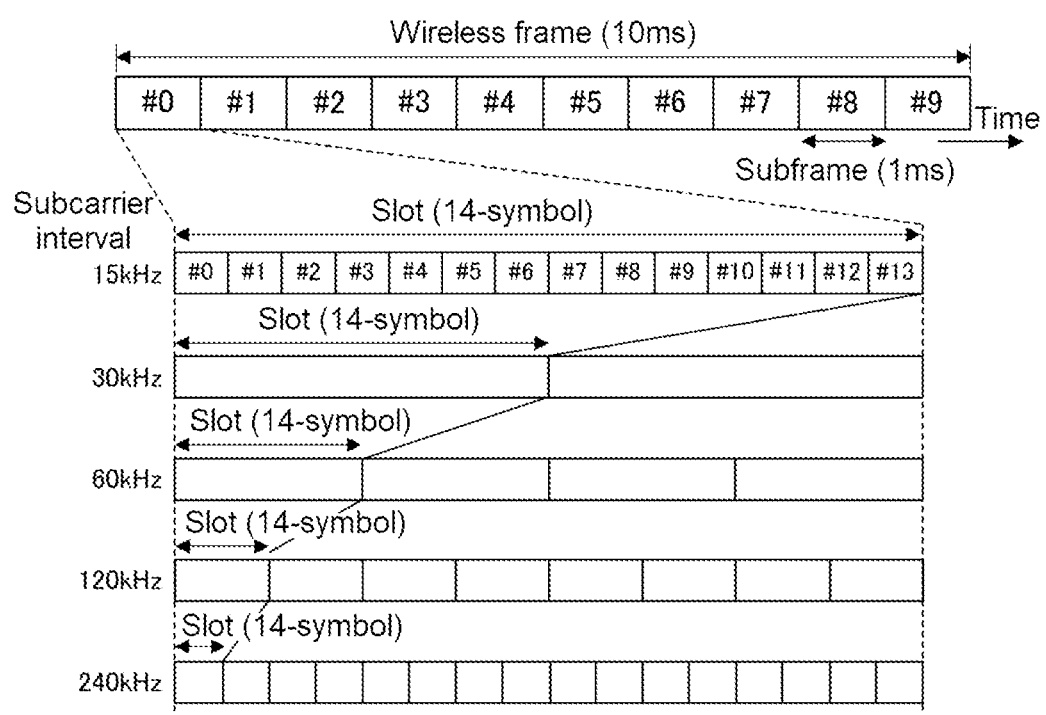
FIG. 6 is a diagram showing a frame configuration of the signal to be measured to be analyzed by the base station simulator according to the first embodiment of the present invention.

The subcarrier interval setting unit 20e is a function unit that controls the setting of the subcarrier interval in the frame configuration of a communication standard to which the signal to be measured belongs, for example, 5G NR (see FIG. 6). The subcarrier interval setting unit 20e can set the subcarrier interval at intervals of, for example, 15 kHz, 30 kHz, 60 kHz, 120 kHz, and 240 kHz (see FIG. 6).

The reception unit 21a is a function unit that is provided corresponding to the uplink path in which the UE 70 transmits a signal (signal to be measured) to the base station simulator 10, and receives the radio frequency signal which is the signal (uplink data).

A transmission unit 21b is provided corresponding to a downlink path in which the UE 70 receives a signal from the base station simulator 10. The transmission unit 21b transmits the baseband data (hereinafter, simply referred to as "IQ data") of an I-phase component (in-phase component) and a Q-phase component (orthogonal component) which are downlink data generated by a base station simulation calculation unit (not shown) described later under the control of the pseudo base station control unit 20a of the control unit 20 to the UE 70. When the UE 70 receives the baseband data transmitted from the transmission unit 21b, the UE 70 transmits the baseband data as a response signal to the reception to the base station simulator 10 as the above-described signal to be measured.

The transmission/reception unit 21 is composed of the transmission unit 21b and the reception unit 21a. The transmission/reception unit 21 communicates with the UE 70 via a Radio Frequency (RF) signal.

The analog signal processing unit 22 is an arithmetic processing function unit that receives an RF signal including uplink data from the UE 70, received by the reception unit 21a, as a signal to be measured, and calculates IQ data obtained by converting the signal to be measured from an analog signal to a digital signal. The analog signal processing unit 22 and the uplink layer processing unit 23 to be described later constitute the signal data calculation unit of the present invention.

The uplink layer processing unit 23 is a part that performs signal processing of each layer of signal data calculated by the analog signal processing unit 22. The uplink layer processing unit 23 includes a PHY processing unit 23a that processes a Physical Layer (PHY layer), a MAC processing unit 23b that processes a Medium Access Control Layer (MAC layer) above the PHY layer, an RLC processing unit 23c that processes a Radio Link Control Layer (RLC layer) above the MAC layer, a PDCP processing unit 23d that processes a Packet Data Convergence Protocol Layer (PDCP layer) above the RLC layer, and an RRC processing unit 23e that processes a Radio Resource Control Layer (RRC layer) above the PDCP layer.

In the uplink layer processing unit 23, the PHY processing unit 23a performs signal processing in the PHY layer on the signal data input from the analog signal processing unit 22, and inputs the signal data to the MAC processing unit 23b. Examples of physical layer level channels, control information, and reception status information related to signal processing in the PHY layer are shown below.

First, channels include UpLink-Random Access CHannel (UL-RACH), UpLink Shared CHannel (uplink data channel (UL-SCH)), Physical Random Access CHannel (physical channel for random access (PRACH)), Physical Uplink Shared CHannel (PUSCH), Physical Uplink Control CHannel (PUCCH) and the like.

As the control information, Uplink Control Information (UCI), Scheduling Request (SR), Channel State Information (CSI), Hybrid Automatic Repeat reQuest ACKnowledgement (request response signal (HARQ-ACK)), Sounding Reference Signal (SRS) and the like are used. Further, UCI (SR), which is a UCI in which SR is inserted, UCI (CSI), which is a UCI in which CSI is inserted, and UCI (HARQ-ACK), which is a UCI in which HARQ-ACK is inserted, are also used.

In addition, reception status information includes Discontinuous Transmission (signal non-input state information (DTX)), Cyclic Redundancy Check (redundancy check code for error detection (CRC)) failure information (CRC NG), CRC success information (CRC OK), decoding failure information (Decode NG), decoding success information (Decode OK) and the like.

A configuration is disclosed in which the PHY processing unit 23a shown in FIG. 1 is capable of processing the above-described channel, control information, and reception status information. Further, a configuration is also disclosed in which the PHY processing unit 23a has a demultiplexer (DEMUX) and the uplink data from the PUSCH is separated into two parts, UL-SCH and UCI, and transmitted.

Since the PHY processing unit 23a has a configuration capable of processing the above-described channel, control information, and reception status information, the base station simulator 10 can perform tests according to various test scenarios such as the following test scenarios 1 to 3.

Test scenario 1: The pseudo base station transmits a test signal as downlink data to the UE 70, and checks whether there are responses, for example, UCI (SR), UCI (CSI), and UCI (HARQ-ACK), from the UE 70.

Test scenario 2: The pseudo base station transmits a test signal as downlink data to the UE 70, and grasps the reception status from the response with, for example, either DTX, CRC NG, CRC OK, or Decode NG, and Decode OK from the UE 70.

Test scenario 3: Perform tests based on test scenarios 1 and 2 at each channel level.

The MAC processing unit 23b processes each processing signal of the PHY layer input from the PHY processing unit 23a as a signal of the MAC layer, and passes the processed signal to the RLC processing unit 23c. The RLC processing unit 23c processes each processing signal of the MAC layer input from the MAC processing unit 23b as a signal of the RLC layer, and passes the processed signal to the PDCP processing unit 23d. The PDCP processing unit 23d processes each processing signal of the PLC layer input from the RLC processing unit 23c as a signal of the PDCP layer, and passes the processed signal to the RRC processing unit 23e. The RRC processing unit 23e processes each processing signal of the PDCP layer input from the PDCP processing unit 23d as a signal of the PRC layer.

In the uplink layer processing unit 23, the signal of each layer processed by the PHY processing unit 23a, the MAC processing unit 23b, the RLC processing unit 23c, the PDCP processing unit 23d, and the RRC processing unit 23e is transmitted to the log data generation unit 24. Of these, the signal of each layer processed by the PHY processing unit 23a and the MAC processing unit 23b is also is transmitted to the trigger detection unit 25.

As described above, the uplink layer processing unit 23 performs a communication protocol process of each layer in accordance with a predetermined communication standard, processes the signal data from the analog signal processing unit 22 to output the signal data to the log data generation unit 24, and outputs the signal data of the PHY layer and the MAC layer to the trigger detection unit 25.

The log data generation unit 24 generates log data from the signal data output from the uplink layer processing unit 23. The log data generated by the log data generation unit 24 includes time information and identifier information. The log data generated by the log data generation unit 24 is stored in a log data storage unit (not shown) composed of a large-capacity storage medium such as a hard disk drive (HDD) or a flash memory, for example.

The log data generation unit 24 has an IQ analysis parameter generation unit 24a. The IQ analysis parameter generation unit 24a generates IQ analysis parameters based on the signal data generated as described above, and transmits the generated IQ analysis parameters to a log data display unit 28a described later.

The trigger detection unit 25 has a function of monitoring the communication state involved in the above-described channels, control information and reception status information of the PHY layer and the MAC layer, based on the signal data of the PHY layer and the MAC layer input from the PHY processing unit 23a and the MAC processing unit 23b of the uplink layer processing unit 23, and determining (detecting) whether or not a communication state satisfies a preset trigger condition. The trigger condition is composed of, for example, a channel, a signal (for example, limited to the PHY layer and the MAC layer) type, and a reception status to be analyzed. The trigger condition can be set for each cell of a plurality of pseudo base stations (cells) under the control of the pseudo base station control unit 20a provided in the control unit 20, for example. The trigger condition is set, under the control of the trigger setting unit 20b constituting the control unit 20, by using the setting screen displayed on a trigger setting display unit 28b of the display unit 28 described later.

Among the information constituting the trigger condition, the cell to be analyzed can be selectively designated from the plurality of pseudo base stations (cells) under the control of the pseudo base station control unit 20a. As the signal or channel to be analyzed, any one of ULSCH, UCI (SR), UCI (CSI), UCI (HARQ-ACK), PRACH or SRS can be selectively designated from the channels or control information described in the explanation of the configuration of the PHY processing unit 23a. Further, the reception status can also be selectively designated from the above-described DTX, CRC NG, CRC OK, Decode NG, or Decode OK. The trigger condition may further include the total received power (total Power) of the signal to be analyzed.

The trigger detection unit 25 has a function of transmitting a trigger signal instructing to store the signal data under the communication state in the IQ data memory unit 26, when detecting that a communication state satisfying the trigger condition has occurred. The trigger detection unit 25 constitutes the trigger signal output unit of the present invention.

The IQ data memory unit 26 stores signal data calculated by the analog signal processing unit 22, and is composed of, for example, a ring buffer memory. When the trigger signal is input from the trigger detection unit 25, the IQ data memory unit 26 stores the signal data (IQ data) calculated by the analog signal processing unit 22 in the ring buffer memory.

Figure 5A:
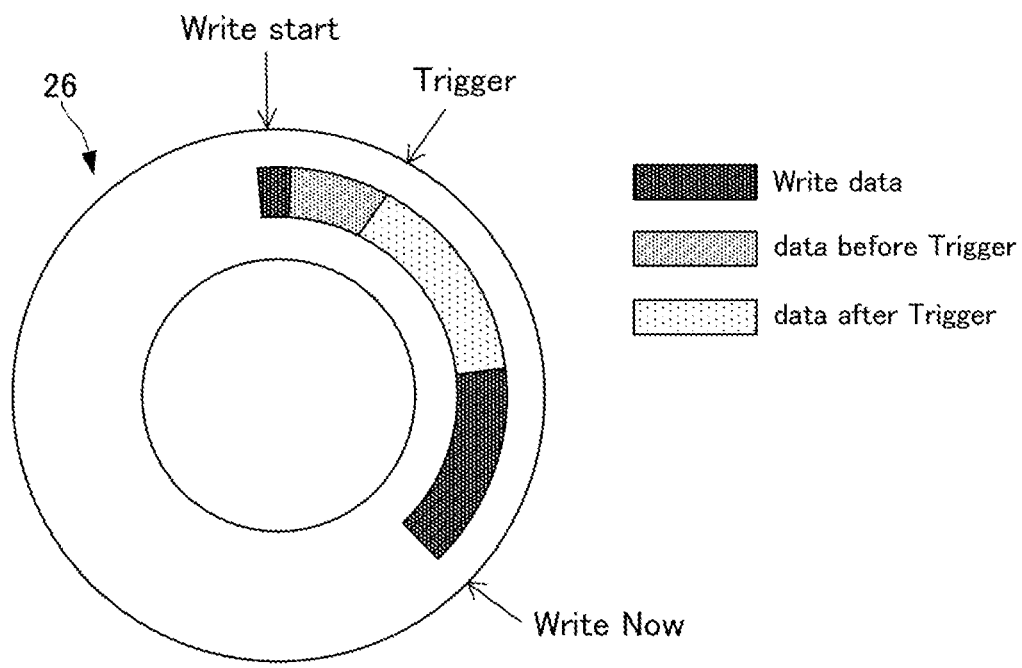
FIGS. 5A and 5B are conceptual diagrams for explaining an acquisition image of IQ data using a ring buffer memory of the base station simulator according to the first embodiment of the present invention.

Since the IQ data memory unit 26 is composed of a ring buffer memory, when the trigger is set, for example, as shown in FIG. 5A, writing of IQ data to the buffer memory is started before the trigger signal is generated (input), and when the trigger signal is generated (input), the writing of the IQ data is stopped within the range that does not overwrite the previous data in the designated range. With such a structure, the IQ data memory unit 26 can acquire IQ data before the trigger signal is generated.

Figure 5B:
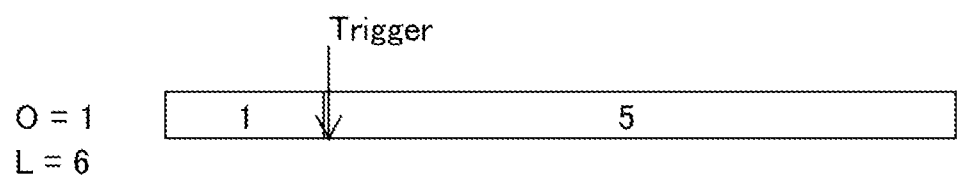

Here, the range of IQ data acquired from the timing when the trigger signal is generated is determined based on, for example, the time before the trigger signal (Trigger Offset O) and the data acquisition time (Data length L), as shown in FIG. 5B. FIG. 5B shows an example in which the ratio of Trigger Offset O to Data length L is 1:6, and IQ data corresponding to the data acquisition time (Data length L) and the addition time of 5 times the data acquisition time is acquired. As described above, the IQ data memory unit 26 has a function of receiving a trigger signal and extracting IQ data in a predetermined section according to a predetermined timing from the signal data, and constitutes the signal extraction unit of the present invention. Further, the IQ data memory unit 26 stores the signal data calculated by the analog signal processing unit 22 in the ring buffer memory, and constitutes the storage unit of the present invention.

The IQ data analysis unit 27 is a processing function unit that analyzes and processes IQ data stored in the IQ data memory unit 26 under the control of the analysis control unit 20c, and includes an IQ data reading unit 27a, a parameter reading unit 27b, and data analysis unit 27c. The IQ data reading unit 27a performs a process of reading IQ data stored in the IQ data memory unit 26. The parameter reading unit 27b executes a process of reading the IQ analysis parameters generated by the IQ analysis parameter generation unit 24a of the log data generation unit 24 in accordance with the IQ data reading by the IQ data reading unit 27a. The data analysis unit 27c executes a process of analyzing the IQ data read from the IQ data memory unit 26 based on the IQ analysis parameters. The IQ data analysis unit 27 and the IQ data memory unit 26 are preferably connected by a wired cable. The data analysis unit 27c constitutes the analysis unit of the present invention.

The display unit 28 includes a log data display unit 28a, a trigger setting display unit 28b, and an analysis result display unit 28c. The log data display unit 28a is a part that displays a display screen for displaying a log, and the trigger setting display unit 28b is a part that displays a setting screen 30 (see FIG. 2) for setting a trigger condition, and the analysis result display unit 28c is a part that displays analysis result screens 40 (see FIG. 8). The analysis result display unit 28c constitutes the display unit of the present invention.

In the control unit 20, the display control unit 20d generates a display screen for displaying the log, reads the log data from the log data storage unit according to the operation contents of the operation unit 29, and displays the log based on the information included in the log data on the log data display unit 28a. The display control unit 20d also generates the setting screen 30 (see FIG. 2) for setting the trigger condition, reads the setting screen 30 according to the operation contents of the operation unit 29, and displays the setting screen 30 on the trigger setting display unit 28b. Further, the display control unit 20d generates the analysis result screen 40 (see FIG. 8) for displaying the analysis result of the IQ data by the IQ data analysis unit 27, reads the analysis result screen 40 according to the operation contents of the operation unit 29, and displays the analysis result screen 40 on the analysis result display unit 28c.

The operation unit 29 is composed of an input device such as a keyboard, dial or mouse, a display for displaying test conditions, control circuits and software for controlling these, and is operated by the examiner to input each test condition, and set display contents of the display unit 28.

The operation of the base station simulator 10 having the above-described configuration will be described below. As described above, in the base station simulator 10, in the test performed according to the test scenario under the control of the pseudo base station control unit 20a, the RF signal (signal to be measured) including the uplink data from the UE 70 is received by the reception unit 21a, and the signal data including the IQ data is calculated by the signal processing in the analog signal processing unit 22.

The signal data calculated by the analog signal processing unit 22 is input to the uplink layer processing unit 23 and subjected to signal processing of each layer, and the signal data after signal processing of the PHY layer and the MAC layer is input to the trigger detection unit 25. The signal data (IQ data) calculated by the analog signal processing unit 22 is also input to the IQ data memory unit 26.

In the base station simulator 10 having such an uplink signal processing function, in order to analyze the signal data input from the analog signal processing unit 22 to the IQ data memory unit 26, it is necessary to set the trigger condition for issuing the trigger signal that activates the acquisition operation of the IQ data to be analyzed in the IQ data memory unit 26.

Figure 3:
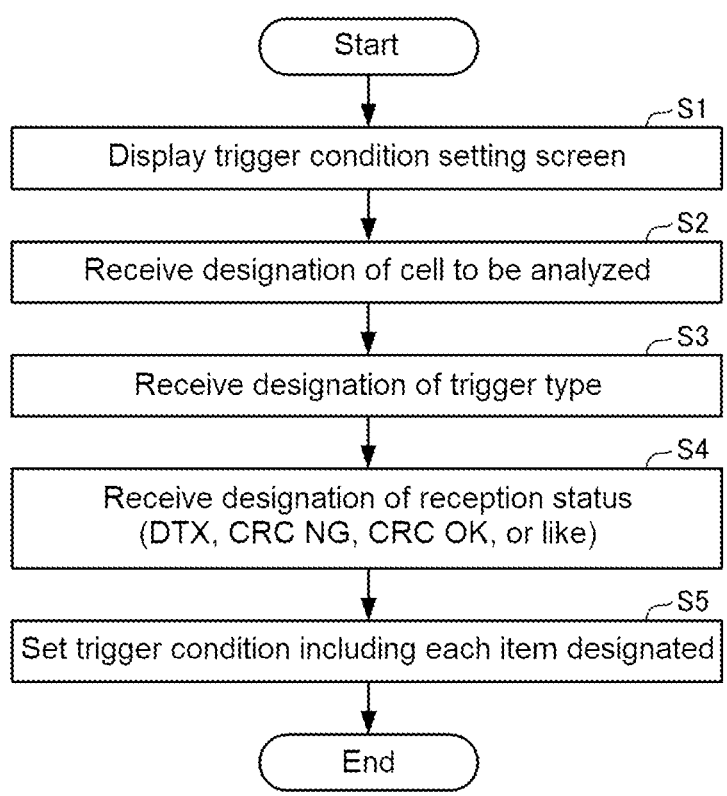
FIG. 3 is a flowchart showing a trigger condition setting processing operation in the base station simulator according to the first embodiment of the present invention.

The trigger condition setting processing operation in the base station simulator 10 will be described with reference to the flowchart shown in FIG. 3.

In order to set the trigger condition in the base station simulator 10, first, the operation unit 29 performs a predetermined trigger setting start operation. By this trigger setting start operation, the trigger setting unit 20b causes the trigger setting display unit 28b of the display unit 28 to display the trigger condition setting screen 30 (step S1).

Figure 2:
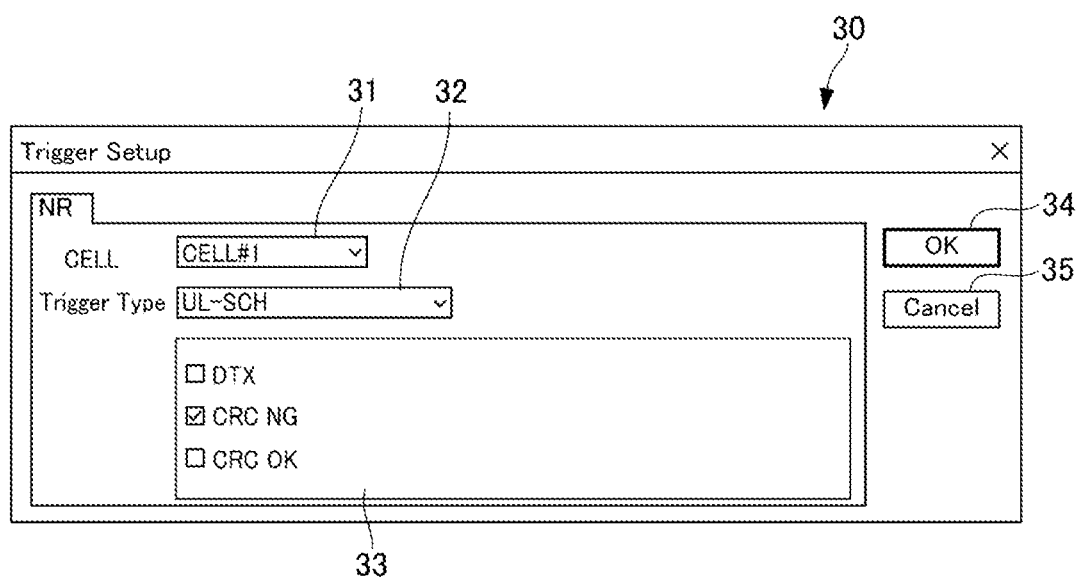
FIG. 2 is a diagram showing a configuration example of a trigger condition setting screen in the base station simulator according to the first embodiment of the present invention.

As shown in FIG. 2, the setting screen 30 includes, for example, a cell designation tool 31, a trigger type designation tool 32, a reception status designation tool 33, an OK button 34, and a cancel button 35. The cell designation tool 31 is for selectively designating a pseudo base station (cell) to be analyzed for IQ data. The trigger type designation tool 32 is for selectively designating the signal type (trigger type) to be analyzed. The reception status designation tool 33 is for selectively designating the communication state (reception status) of the signal to be analyzed. The OK button 34 is a tool for instructing the start of setting, and the cancel button 35 is a tool for instructing cancellation of the setting.

After the setting screen 30 is displayed in step S1, the trigger setting unit 20b receives the designation of the cell to be analyzed by the cell designation tool 31 on the setting screen 30 (step S2). The cell option is all pseudo base stations under the control of the pseudo base station control unit 20a.

Next, the trigger setting unit 20b receives the designation of the trigger type by the trigger type designation tool 32 on the setting screen 30 (step S3). The trigger type option is, for example, either ULSCH, UCI (SR), UCI (CSI), UCI (HARQ-ACK), PRACH or SRS.

Subsequently, the trigger setting unit 20b receives the designation of the reception status of the signal to be analyzed by the reception status designation tool 33 on the setting screen 30 (step S4). Examples of the communication state options include DTX, CRC NG, CRC OK, or Decode NG, Decode OK and the like.

Further, the trigger setting unit 20b monitors whether or not the OK button 34 on the setting screen 30 is pressed, and when the OK button 34 is pressed, the trigger setting unit 20b sets the trigger condition including each item designated in the above steps S2 to S4 (step S5), and completes a series of trigger condition setting processes.

FIG. 2 shows a display example of the setting screen 30 at the time of setting a trigger condition in which the cell to be analyzed is a cell having an identifier of "CELL If 1", the trigger type is "UL-SCH", and the reception status is "CRC NG".

The trigger condition set as described above is passed from the trigger setting unit 20b to the trigger detection unit 25. The trigger detection unit 25 monitors whether or not the communication state satisfies the trigger condition acquired from the trigger setting unit 20b. When it is detected that the communication state satisfies the trigger condition, the trigger detection unit 25 outputs a trigger signal to the IQ data memory unit 26 at a predetermined timing.

According to the trigger condition set on the setting screen 30 shown in FIG. 2, the base station simulator 10 outputs the trigger signal when the signal data using the UL-SCH of the uplink data from the UE 70 is CRC NG, in the simulated communication between the cell having the identifier of "CELL #1" and the UE 70.

When receiving the trigger signal, the IQ data memory unit 26 acquires (stores) IQ data in a predetermined section (corresponding to the predetermined timing) as an analysis target from the signal data calculated by the analog signal processing unit 22. Then, the IQ data analysis unit 27 executes the analysis process on the IQ data stored in the IQ data memory unit 26.

Next, the IQ data analysis processing operation in the base station simulator 10 will be described with reference to the flowchart shown in FIG. 4. Here, it is assumed that the base station simulator 10 performs the test of the UE 70 according to the test scenario under the control of the pseudo base station control unit 20a and transmit and receive a radio frequency signal to and from the UE 70. It is premised that the IQ data analysis process in the base station simulator 10 is performed on the uplink data transmitted from the UE 70 to the base station simulator 10 in the test.

In performing the IQ data analysis process, the trigger detection unit 25 acquires and holds the trigger condition set by the trigger setting unit 20b (step S11).

After that, when the test of the UE 70 is started under the control of the pseudo base station control unit 20a, the radio frequency signal is transmitted and received to and from the UE 70, and the uplink data from the UE 70 is received by the reception unit 21a (step S12), and is input to the analog signal processing unit 22.

Next, the analog signal processing unit 22 receives the uplink data input from the reception unit 21a as a signal to be measured, converts the signal to be measured from an analog signal to a digital signal, and executes an arithmetic process for calculating signal data (IQ data) (step S13).

The signal data calculated by the arithmetic process in step S13 is transmitted to the uplink layer processing unit 23 and the IQ data memory unit 26 (step S14).

The uplink layer processing unit 23 sequentially performs the processes of the PHY layer, the MAC layer, the RLC layer, the PDCP layer, and the RRC layer on the signal data from the analog signal processing unit 22 (step S15). Then, the processed signal data is transmitted to the log data generation unit 24, and the signal data of the PHY layer and the MAC layer is transmitted to the trigger detection unit 25.

The trigger detection unit 25 collates the input signal data of the PHY layer and the MAC layer with the trigger condition that has already been acquired (see step S11), and determines whether or not the communication state of the signal data satisfies the trigger condition (step S16). In a case where it is determined that the communication state of the signal data does not satisfy the trigger condition (NO in step S16), the processes of step S12 and subsequent steps are continued.

On the other hand, in a case where it is determined that the communication state of the signal data satisfies the trigger condition (YES in step 16), the trigger detection unit 25 outputs the trigger signal to the IQ data memory unit 26 at a predetermined timing (step S17).

The IQ data memory unit 26 is composed of a ring buffer memory having a predetermined storage capacity, and always stores (secures) the latest signal data of the above storage capacity among the signal data input from the analog signal processing unit 22. When receiving the trigger signal output by the trigger detection unit 25, the IQ data memory unit 26 extracts IQ data in a predetermined section corresponding to the predetermined timing described above from the secured signal data (step S18).

Next, in the IQ data analysis unit 27, the IQ data reading unit 27a reads IQ data in a predetermined section from the IQ data memory unit 26, and the data analysis unit 27c executes an analysis process of the read IQ data (step S19). Here, the data analysis unit 27c analyzes the read IQ data, based on the IQ analysis parameters read from the log data by the parameter reading unit 27b.

After the IQ data analysis process in step S19 is completed, the display control unit 20d executes the analysis result display process for displaying the analysis result of the IQ data on the display unit 28 (step S20). Specifically, in the signal analysis device 1, in step S19, the data analysis unit 27c analyzes a predetermined analysis item for each time domain in the frame configuration (see FIG. 6) of the signal to be measured determined by the OFDM method to calculate a plurality of analysis results corresponding to each time domain.

FIG. 6 shows, for example, a frame configuration of signal data in the 5G NR standard, which is the analysis target of the base station simulator 10 according to the present embodiment. As shown in FIG. 6, in 5G NR, slots, subframes, and frames are configured with a plurality of OFDM symbols. A slot is composed of 14 OFDM symbols regardless of the subcarrier interval, a subframe is defined as a section of 1 ms, and a frame is defined by 10 subframes. In the frame configuration of FIG. 6, the symbols that are the time domain defined by the OFDM method are identified by the reference numerals 0(#0) to 13(#13).

Figure 8:
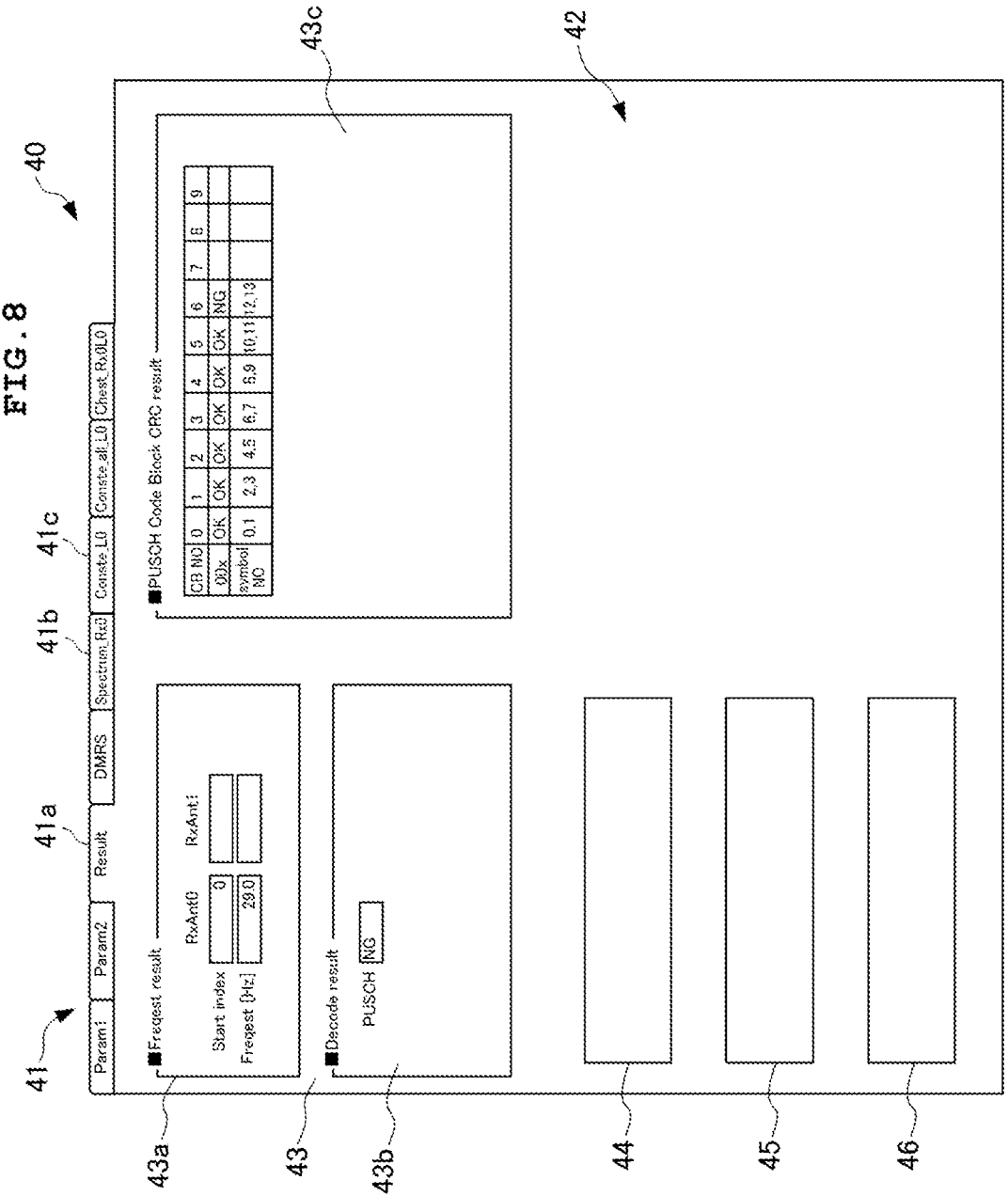
FIG. 8 is a diagram showing a configuration example of an analysis result display screen of a signal to be measured in the base station simulator according to the first embodiment of the present invention.

For the signal to be measured having such a frame configuration, the data analysis unit 27c calculates a plurality of analysis results corresponding to the time domains (symbols) determined by the OFDM method for a predetermined analysis item in step S19, and then in S20, the display control unit 20d performs control to arrange these plurality of analysis items and display the analysis items on the analysis result display unit 28c of the display unit 28 as the analysis result screen 40 (see FIG. 8). Here, in the base station simulator 10 according to the present embodiment, the data analysis unit 27c has a processing function of decoding the signal to be measured in units of CBs of symbols forming a predetermined slot, and can analyze the decoding result of whether the decoding is success (OK) or failure (NG) for each CB.

While displaying the IQ data analysis result in step S20, when a predetermined display end operation is performed, the display control unit 20d performs control to end the display process of the analysis result screen 40 and the pseudo base station control unit 20a performs control to end the above a series of IQ data analysis process.

Figure 4:
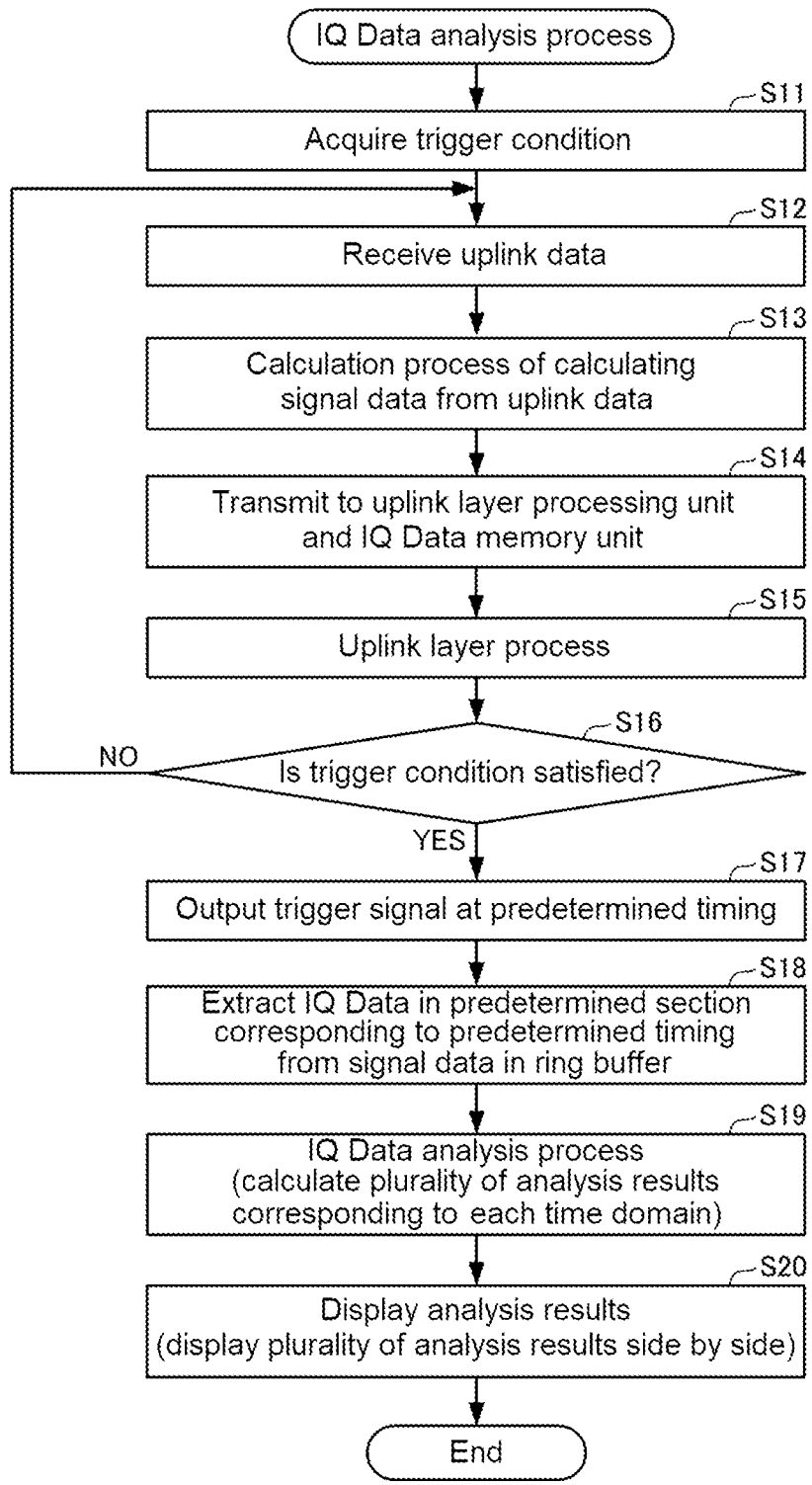
FIG. 4 is a flowchart showing an IQ data analysis processing operation in the base station simulator according to the first embodiment of the present invention.

According to the base station simulator 10 that sets the trigger condition by using the setting screen 30 shown in FIG. 2 and executes the IQ data analysis process according to the flowchart shown in FIG. 4, it becomes possible to analyze IQ data according to the above-described test scenarios 1 to 3 and the like, regarding the signal processing of the PHY layer of the uplink data from the UE 70.

The present embodiment illustrates an example in which the signal data (the signal stored corresponding to the output of the trigger signal) extracted by the IQ data memory unit 26 is the signal data of the physical layer (PHY layer) and the trigger condition set by the trigger setting unit 20b is contents including the trigger type and the reception status, but the present invention is not limited to this. For example, the trigger condition may be the information form including the information managed in accordance with each pseudo base station under the control of the pseudo base station control unit 20a, for example, the act time (the period for activating the communication operation of the pseudo base station).

Next, the display processing operation of the analysis result of the signal to be measured will be described.

In the base station simulator 10 according to the present embodiment, in the analysis result display process in step S20 of FIG. 4, for example, the analysis result screen 40 having the display form shown in FIG. 8 is displayed on the analysis result display unit 28c.

As shown in FIG. 8, the analysis result screen 40 includes an analysis item selection tab 41 and an analysis result display area 42 for displaying the analysis results of a plurality of analysis items. A plurality of analysis item selection tabs 41 are provided corresponding to the plurality of analysis items, respectively, and are pressed for the purpose of selecting respective analysis items. In this example, the analysis item selection tab 41 includes, as analysis items, at least a "Result" tab 41a for selecting the analysis result under preset analysis conditions, a "Spectrum_Rx0" tab 41b for selecting a spectrum, or a "Conste_L0" tab 41c for selecting constellation.

The analysis result display area 42 includes a main analysis result display area 43, a spectrum display area 44 that is a sub analysis result display area, a time domain signal display area 45, and a constellation display area 46.

The main analysis result display area 43 includes a "Freqe st result" display area 43a, a "Decode result" display area 43b, and a "PUSCH Code Black CRC result" display area 43c. The "Freqe st result" display area 43a has a function of displaying the amount of deviation from the preset frequency as "Freqe st: Frequency error estimation". In this example, the display form when the signal to be measured being received deviates from the set value by 29.0 Hz is shown. In addition, Freqe st does not constitute an analysis item of the present invention.

The "Decode result" display area 43b has a function of setting signal analysis conditions in relation to the type of the signal to be measured and whether the decoding process is success (OK) or failure (failure: NG). This example shows, as a signal analysis condition, a display form when it is set to perform signal analysis on the condition that the decoding process of a signal of the type PUSCH has failed (NG).

The "PUSCH Code Black CRC result" display area 43c has a function of displaying a list of error occurrence or non-occurrence status for each code block (CB) for the signal type PUSCH. Here, the signal to be measured is composed of 14 CBs identified by 14 numbers from the number 0 to the number 13, and each CB is composed of, for example, two symbols. This example shows an example in which CB numbers 0, 1, 2, 3, 4, 5, and 6 respectively include two symbols of symbol numbers 0 and 1, 2 and 3, 4 and 5, 6 and 7, 8 and 9, 10 and 11, and 12 and 13. As described above, in the base station simulator 10, the display control unit 20d has a control function of displaying the length of the symbol included in the slot in the frame configuration (see FIG. 6) described above.

In the "PUSCH Code Black CRC result" display area 43c, the CB number and the symbol number are associated with each other, the error occurrence or non-occurrence status under the analysis conditions that have been set in the "Decode result" display area 43b is displayed, corresponding to the CB number and the symbol number which are associated with each other. In particular, FIG. 8 illustrates an example of an analysis result in which the decoding of the signal to be measured corresponding to the CB number 6 and the symbol numbers 12 and 13 is NG and the decoding of the signal to be measured corresponding to the other CB number and the symbol numbers is OK.

The "Freqe st result" display area 43a, the "Decode result" display area 43b, and the "PUSCH Code Black CRC result" display area 43c are opened on the analysis result screen 40 in response to, for example, a pressing operation of the "Result" tab 41a in the analysis item selection tab 41, and is normally in a closed state.

In the sub analysis result display area, the spectrum display area 44 has a function of displaying the spectrum waveform corresponding to each symbol number of each CB in response to the operation of pressing the "Spectrum_Rx0" tab 41b in the analysis item selection tab 41, for example.

The time domain signal display area 45 has a function of displaying a time domain signal waveform corresponding to each symbol number of each CB in a mode different from the mode when the pull-down menu of the "Spectrum_Rx0" tab 41b is not used, by performing, for example, an operation of selecting "change display form" from the pull-down menu provided in relation with the "Spectrum_Rx0" tab 41b.

The constellation display area 46 has a function of displaying a constellation graph corresponding to each symbol number of each CB in response to a pressing operation of the "Conste_L0" tab 41c in the analysis item selection tab 41, for example.

In FIG. 8, a configuration is illustrated in which the main analysis result display area 43, the spectrum display area 44, the time domain signal display area 45, and the constellation display area 46 are opened on the analysis result screen 40 in response to the pressing operation of, for example, a "Result" tab 41*a*, "Spectrum_Rx0" tab 41*b* (pull-down menu), and the "Conste_L0" tab 41*c* in the analysis item selection tab 41, but the main analysis result display area 43, the spectrum display area 44, the time domain signal display area 45, and the constellation display area 46 may be configured to be displayed in a state of being always open.

The operation of the display processing (corresponding to the process of step S20 in FIG. 4) of the analysis result screen 40 having the above configuration in the base station simulator 10 according to the present embodiment will be described in more detail with reference to the flowchart shown in FIG. 7.

It is assumed that in the display process of the analysis result screen 40, the signal to be analyzed by the base station simulator 10 (the signal to be measured transmitted from the UE 70) is, for example, a 5G NR standard signal, and is the signal is to which the coding/decoding method using a Low Density Parity Check (LDPC) code is applied. This signal is composed of, for example, seven CBs identified by CB numbers 0, 1, 2, 3, 4, 5, and 6. It is assumed that the seven CBs are composed of two symbols identified by symbol numbers 0 and 1, 2 and 3, 4 and 5, 6 and 7, 8 and 9, 10 and 11, and 12 and 13, respectively.

In the base station simulator 10 according to the present embodiment, for example, in step S19 of FIG. 4, the data analysis unit 27*c* analyzes the signal to be measured having the above-described configuration for each time domain of CB or symbol, and calculates the analysis results of a plurality of analysis items corresponding to each time domain. Examples of the plurality of analysis items include analysis results based on analysis conditions set before the start of signal analysis (in this example, error occurrence status related to decoding process for each CB or symbol), spectra, constellations, and the like. The calculated analysis result data of each analysis item is stored in, for example, the storage medium (memory) of the above-described microcomputer.

Subsequently, in step S20 of FIG. 4, the display control unit 20*d* performs display control for displaying the analysis result screen 40 (basic screen) including the above-described plurality of analysis items on the analysis result display unit 28*c*, and updating and displaying the analysis result screen 40 of the display form including the analysis result of the selected analysis item while receiving the selection of the desired analysis item. The display control at this time is performed according to the flowchart shown in FIG. 7.

Figure 7:
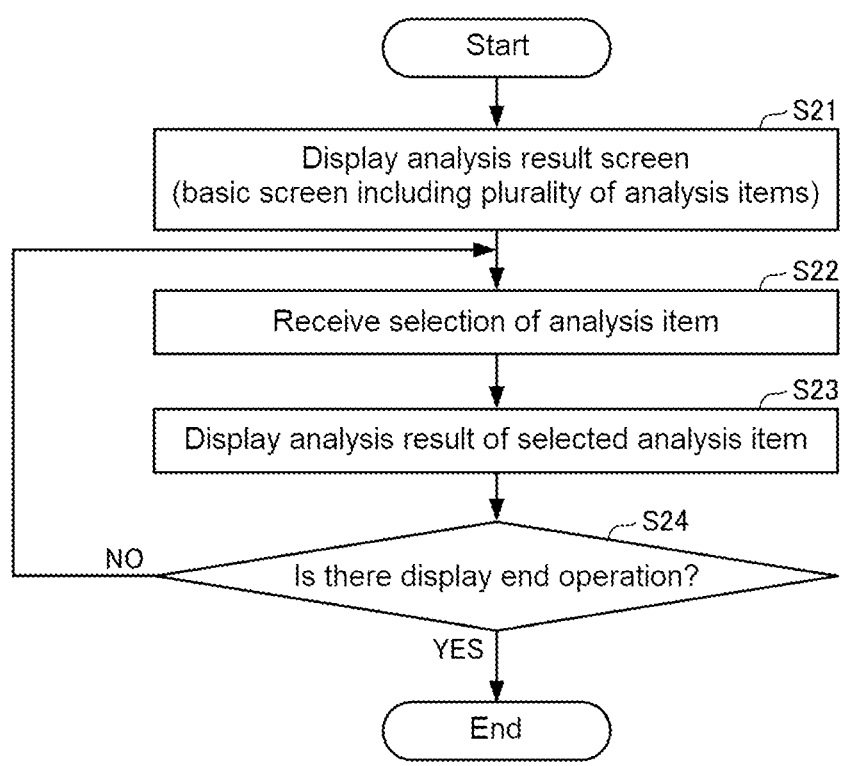
FIG. 7 is a flowchart showing an IQ data analysis result display processing operation in the base station simulator according to the first embodiment of the present invention.

When the display control shown in FIG. 7 is started, the display control unit 20*d* first reads basic screen data (image data) including a plurality of analysis items calculated in step S19 of FIG. 4 from, for example, a memory, and performs control to display the analysis result screen 40 as the basic screen based on the basic screen data (step S21). The basic screen is, for example, the analysis result screen 40 shown in FIG. 8, in which the analysis item selection tab 41 is displayed and none of the display areas corresponding to each analysis item in the analysis result display area 42 is opened.

While displaying the analysis result screen (basic screen) 40 in step S21, the display control unit 20*d* receives an operation of selecting a desired analysis item by the operator (step S22). Here, the operator can perform a selection operation of the desired analysis item, by using the analysis item selection tab 41, in particular, for example, the "Result" tab 41*a*, the "Spectrum_Rx0" tab 41*b* (including the pull-down menu), the "Conste_L0" tab 41*c*, and the like on the analysis result screen 40, and the display control unit 20*d* receives the selection operation of each of these tabs.

Next, the display control unit 20*d* reads the analysis result data of the analysis item selected in step S22 from the memory, and performs control to display the analysis result in the display area corresponding to the analysis item on the analysis result screen 40, based on the analysis result data (step S23).

As a specific example, when the pressing operation of, for example, the "Result" tab 41*a* on the analysis result screen 40 is received, as shown in FIG. 8, the display control unit 20*d* displays the analysis result screen 40 having a display form in which only the "Freqe st result" display area 43*a*, the "Decode result" display area 43*b*, and the "PUSCH Code Black CRC result" display area 43*c* configuring the main analysis result display area 43 are opened, and other display areas (the spectrum display area 44, the time domain signal display area 45, and the constellation display area 46) are closed.

In the analysis result screen 40 displayed at this time, in the "Decode result" display area 43*b*, an analysis condition "PUSCH NG" indicating that the analysis is executed on the condition that the decoding of the PUSCH signal fails is displayed. Further, in the "PUSCH Code Black CRC result" display area 43*c*, information pertaining to the presence or absence of an error occurrence in decoding, that is, decoding success or failure is displayed as corresponding "OK" or "NG" character, in association with the symbol numbers constituting the CB identified by the CB number corresponding to the CB number of the signal to be measured.

While the analysis result screen 40 is displayed in step S21, the operator can recognize that a decoding failure (NG) has occurred in the CB whose CB number of the signal to be measured is 6, from the display contents of the "PUSCH Code Black CRC result" display area 43*c*. Further, the operator can also grasp that the symbols of decoding failure (NG) are the symbols identified by the symbol numbers 12 and 13. After that, when the operator performs the operation of selecting the desired analysis item on the analysis result screen 40, display is shifted to the mode for selectively displaying the detailed analysis result of the selected analysis item.

When the pressing operation of, for example, the "Spectrum_Rx0" tab 41*b* is received on the analysis result screen 40 as an example of the display operation of the analysis result of the analysis item selected by the operator, the display control unit 20*d* displays the analysis result screen 40 having a display form in which the spectrum display area 44 is opened, and the spectrum corresponding to each symbol of the signal to be measured is displayed in the spectrum display area 44.

Further, when an operation of selecting, for example, "change display form" from the pull-down menu of the "Spectrum_Rx0" tab 41*b* on the analysis result screen 40 is received, the display control unit 20*d* displays the analysis result screen 40 having a display form in which the time domain signal display area 45 is opened, and a spectrum of another form corresponding to each symbol of the signal to be measured is displayed in the time domain signal display area 45.

Further, when the selection operation of, for example, the "Conste_L0" tab 41*c* is received on the analysis result screen 40, the display control unit 20*d* displays the analysis result screen 40 having a display form in which the constellation display area 46 is opened and the constellation corresponding to each symbol of the signal to be measured is displayed in the constellation display area 46.

While repeatedly executing the processes of steps S22 and S23, the display control unit 20*d* monitors, for example, whether or not the display end operation is performed by the operation unit 29 (step S24). When it is determined that the display end operation has not been performed (NO in step S24), the display control unit 20*d* executes the display control of step S22 and subsequent steps. When it is determined that the display end operation has been performed (YES in step S24), the display control unit 20*d* ends the above series of display control.

Next, the specific display form of the main analysis result and the sub analysis result (Spectrum 1, a time domain signal, and a constellation) will be described in more detail with reference to FIGS. 8 to 11.

As described above, according to the display control shown in FIG. 7, in steps S22 and S23, the analysis item selection and the analysis result display control as shown below are performed.

(Selection of Analysis Results)

When the pressing operation of the "Result" tab 41*a* on the analysis item selection tab 41 is received on the analysis result screen 40, the main analysis result display area 43 having the "Freqe st result" display area 43*a*, the "Decode result" display area 43*b*, and the "PUSCH Code Black CRC result" display area 43*c* is opened, and the information corresponding to the "Freqe st result" display area 43*a*, the "Decode result" display area 43*b*, and the "PUSCH Code Black CRC result" display area 43*c*, respectively is displayed. FIG. 8 shows a display example of the analysis result screen 40 at this time.

As shown in FIG. 8, in the "PUSCH Code Black CRC result" display area 43*c* of the analysis result screen 40 at this time, as an analysis result based on the analysis conditions of a PUSCH coding failure (NG) preset in the "Decode result" display area 43*b*, whether the coding of the PUSCH has failed (NG) or succeeded (OK) is displayed in units of CBs of the signal to be measured. Furthermore, the symbol number corresponding to the CB of the signal to be measured is also displayed. Thus, the operator can easily grasp which time domain (in this example, the time domain of the CB corresponding to the CB number 6) of the signal to be measured in which decoding has failed.

Furthermore, after grasping the time domain in which decoding has failed, the cause of decoding error can be further investigated from the perspective of other analysis items, limited to the time domain. According to the present embodiment, Spectrum 1, a time domain signal, and a constellation can be selected as other analysis items.

(Selection of Spectrum 1)

Figure 9:
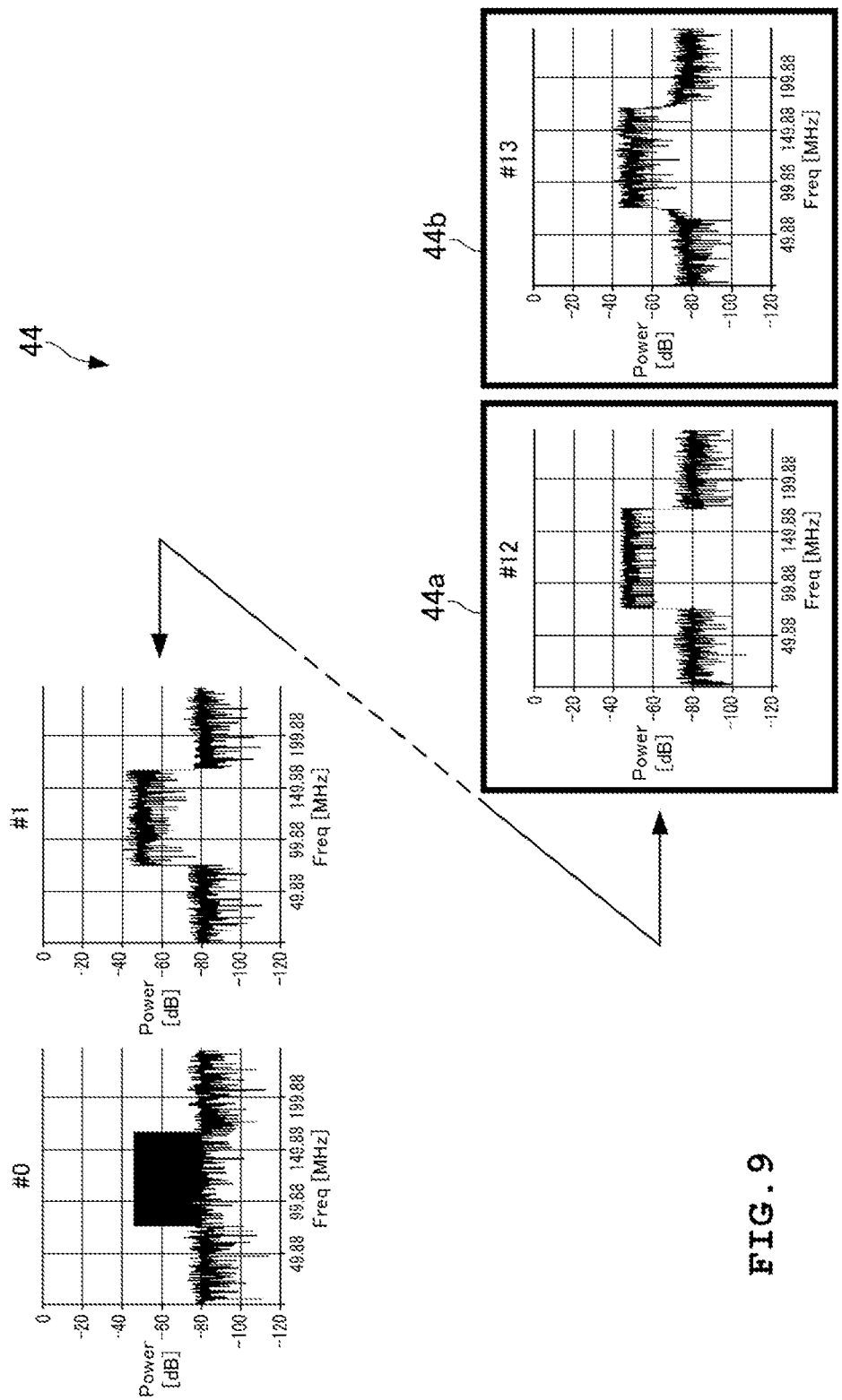
FIG. 9 is a diagram showing another configuration example of an analysis result display screen of a signal to be measured in the base station simulator according to the first embodiment of the present invention.

When the pressing operation of the "Spectrum_Rx0" tab 41*b* is received in the analysis item selection tab 41 on the analysis result screen 40, the spectrum display area 44 is opened, and the spectrum corresponding to each symbol of the signal to be measured is displayed in the spectrum display area 44. FIG. 9 shows a display example of the analysis result screen 40 at this time.

As shown in FIG. 9, in the spectrum display area 44 of the analysis result screen 40 at this time, the analysis results of Spectrum 1 corresponding to CBs identified by the CB numbers 0 to 6 are displayed corresponding to the CB numbers 0 to 6. Further, the analysis result of Spectrum 1 displayed on the analysis result screen 40 at this time corresponding to the CB number 6 is displayed in a form surrounded by red frames 44*a* and 44*b* indicating that a decoding error has occurred in each symbol (corresponding to the symbol numbers 12 and 13) constituting the CB of the CB number. The display form surrounded by the red frames 44*a* and 44*b* reflects the analysis result of the decoding failure in the time domain of the CB corresponding to the CB number 6, which has been displayed in the "PUSCH Code Black CRC result" display area 43*c* before shifting to the analysis result screen 40 at this time. Here, an example of displaying red frames 44*a* and 44*b* indicating that a decoding error has occurred is illustrated, but the present invention is not limited to this, as long as it can be emphasized that the decoding error has occurred, for example, it may be displayed in another display form such as displaying in a specific color or highlighting.

As described above, according to the red frame display (highlighting) for the CB in which the decoding error has occurred, the operator can further investigate the cause of the decoding failure in the time domain of the CB corresponding to the CB number 6, by reviewing the spectrum waveform surrounded by the red frames in more detail mainly on the CB with the red frames 44*a* and 44*b*. If necessary, time domain signals having other forms can be read out for further detailed study.

(Selection of Time Domain Signal)

Figure 10:
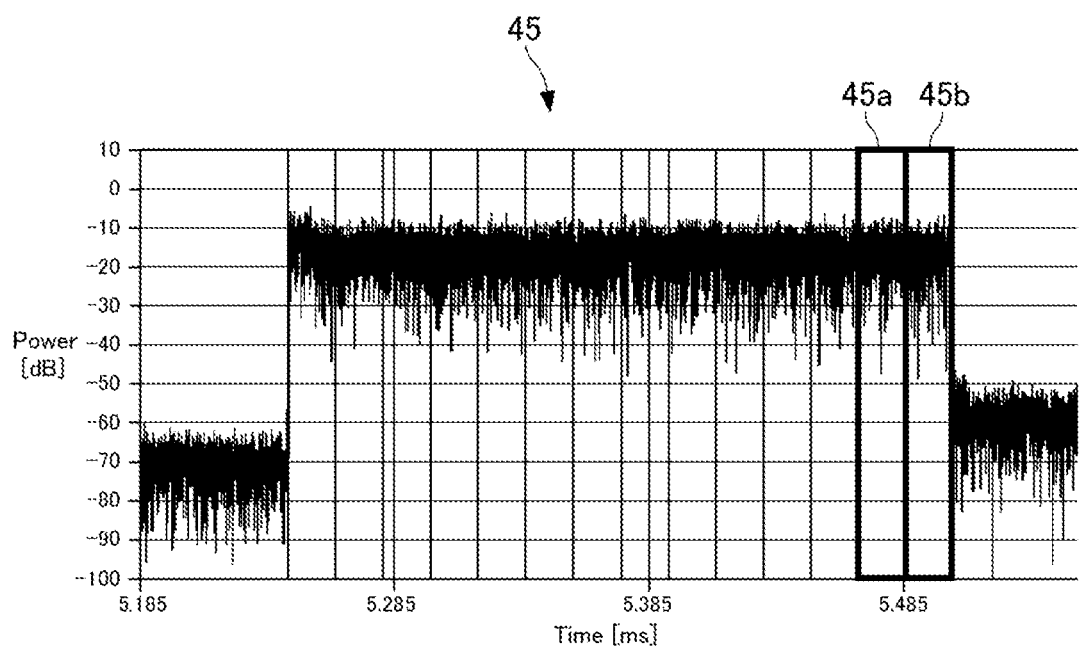
FIG. 10 is a diagram showing a configuration example of an analysis result display screen of a transition destination that can be transitioned from the analysis result display screen according to another configuration example in FIG. 9.

When the "Spectrum_Rx0" tab 41*b* on the analysis item selection tab 41 is pressed on the analysis result screen 40 and the operation of selecting "change display form" is received from the pull-down menu, the time domain signal display area 45 is opened and the time domain signal corresponding to each symbol of the signal to be measured is displayed in the time domain signal display area 45. FIG. 10 shows a display example of the analysis result screen 40 at this time.

As shown in FIG. 10, in time domain signal display area 45 of the analysis result screen 40 at this time, the analysis results of the time domain signals respectively corresponding to CBs identified by the CB numbers 0 to 6 are displayed corresponding to the CB numbers 0 to 6. Further, the analysis result of the time domain signal displayed on the analysis result screen 40 at this time corresponding to the CB number 6 is displayed in a form surrounded by red frames 45*a* and 45*b* indicating that a decoding error has occurred in each symbol (corresponding to the symbol numbers 12 and 13) constituting the CB of the CB number 6. The display form surrounded by the red frames reflects the analysis result of the decoding failure in the time domain of the CB corresponding to the CB number 6, which has been displayed in the "PUSCH Code Black CRC result" display area 43*c* before shifting to the analysis result screen 40 at this time.

As described above, according to the red frame display (which may be another highlighting) for the CB in which the decoding error has occurred, the operator can further investigate the cause of the decoding failure in the time domain of the CB corresponding to the CB number 6, by reviewing the time domain signal waveform surrounded by the red frames 45*a* and 45*b* in more detail mainly on the CB with the red frames 45*a* and 45*b*. If necessary, time domain signals having other forms can be read out for further detailed study. Here, the operator can designate other analysis items and perform a more detailed study on the decoding error from the viewpoint of the other analysis items.

Figure 11:
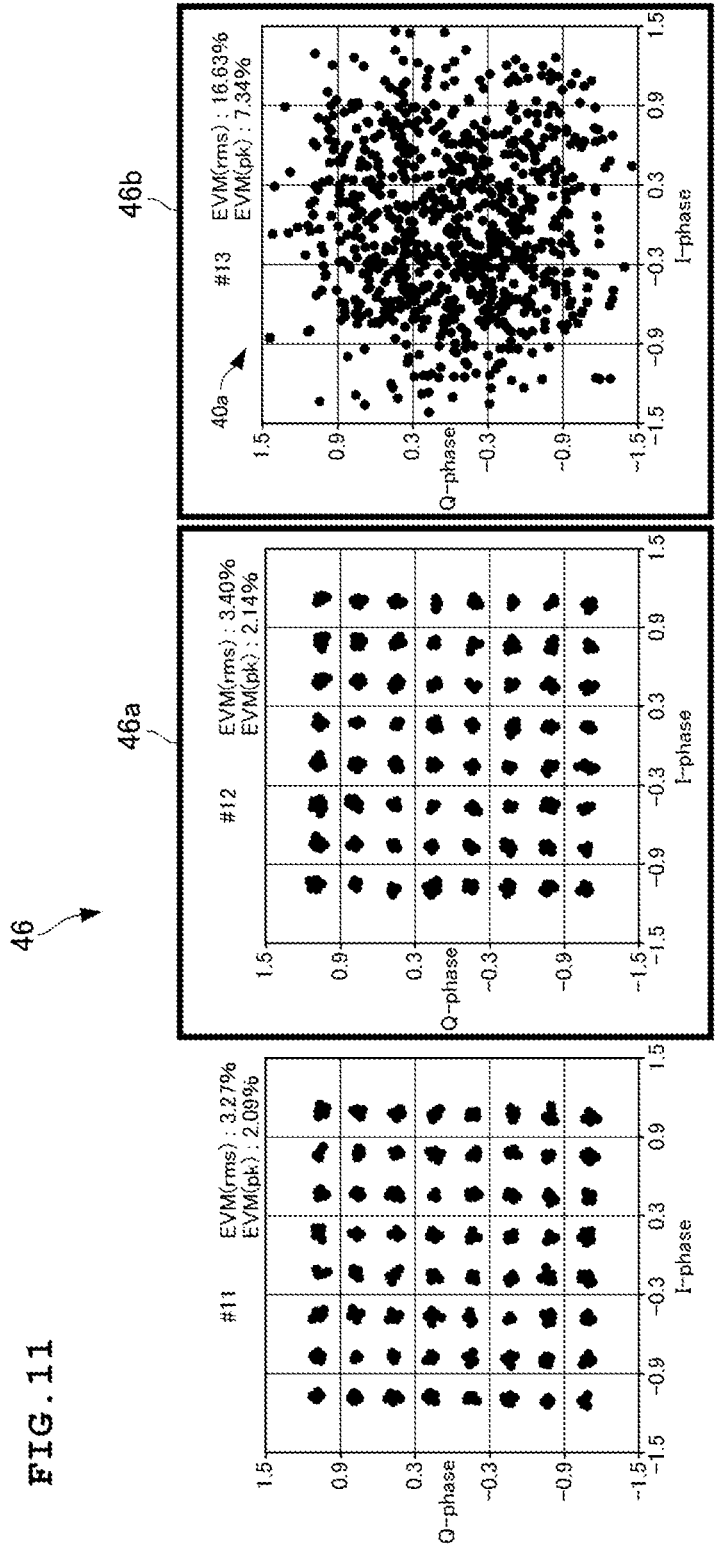
FIG. 11 is a diagram showing still another configuration example of an analysis result display screen of a signal to be measured in the base station simulator according to the first embodiment of the present invention.

(Selection of constellation) When the pressing operation of the "Conste_L0" tab 41*c* on the analysis item selection tab 41 is received on the analysis result screen 40, the constellation display area 46 is opened, and the constellation corresponding to each symbol of the signal to be measured is displayed in the constellation display area 46. FIG. 11 shows a display example of the analysis result screen 40 at this time.

As shown in FIG. 11, in the constellation display area of the analysis result screen 40 at this time, the analysis results of the constellations corresponding to CBs identified by the CB numbers 0 to 6 are displayed corresponding to the CB numbers 0 to 6.

In the constellation display area 46 of the analysis result screen 40 shown in FIG. 11, a so-called constellation display form in which points corresponding to respective measured values of the signal to be measured (multi-level orthogonal modulation signal) are arranged on the IQ coordinate plane is adopted. According to the constellation display form in the constellation display area 46 at this time, it can be observed that points corresponding to respective measured values on the IQ coordinate plane, in the CB time domain (corresponding to the symbol numbers 12 and 13) corresponding to the CB number 6 are scattered at positions significantly deviated from the ideal measurement point of the multi-level orthogonal modulation signal.

Further, the analysis result of the constellation displayed corresponding to the CB number 6 on the analysis result screen 40 at this time is displayed in a form in which the constellations corresponding to the symbol numbers 12 and 13 are surrounded by red frames 46a and 46b indicating that a decoding error has occurred. The display form surrounded by the red frames 46a and 46b reflects the analysis result of the decoding failure in the time domain of the CB corresponding to the CB number 6, which has been displayed in the "PUSCH Code Black CRC result" display area 43c before shifting to the analysis result screen 40 at this time.

As described above, according to the red frame display (which may be another highlighting) for the constellation image of the CB in which the decoding error has occurred, with the constellation as a key, the operator can further investigate the cause of the decoding failure in the time domain of the CB corresponding to the CB number 6, by reviewing the constellation image surrounded by the red frames in more detail mainly on the CB with the red frames.

As described above, the base station simulator 10 according to the present embodiment includes a reception unit 21a that receives a signal to be measured modulated by an OFDM method, an analog signal processing unit 22 that calculates signal data of the signal to be measured received by the reception unit 21a, a data analysis unit 27c that analyzes the signal data for a predetermined analysis item for each time domain defined by the OFDM method, and calculates a plurality of analysis results corresponding to each time domain, and an analysis result display unit 28c that displays the plurality of analysis results side by side.

With this configuration, the base station simulator 10 according to the present embodiment can grasp the communication status of the signal data of the signal to be measured for each time domain, from the plurality of analysis results displayed side by side on the analysis result display unit 28c. Further, when there is an abnormality, the abnormal part can be specified for each time domain.

More specifically, in the base station simulator 10 according to the present embodiment, for example, items for selecting predetermined analysis items such as "analysis result", "frequency spectrum", and "constellation" are further displayed using the corresponding tabs, on the analysis result display unit 28c. Then, the base station simulator 10 further includes a display control unit 20d that performs control to display a plurality of analysis results corresponding to each time domain of a predetermined analysis item, in the analysis result display unit 28c, for example, the "Decode result" display area 43b and the "PUSCH Code Black CRC result" display area 43c, the spectrum display area 44 and the time domain signal display area 45, and the constellation display area 46, when a predetermined analysis item (tab) displayed on the analysis result display unit 28c is selected (pressed).

With this configuration, the base station simulator 10 according to the present embodiment further checks a plurality of analysis results, for example, such as decoding NG or OK, frequency spectrum, and constellation, displayed for the selected analysis item, which enables to more accurately grasp the communication status for each time domain of the signal to be measured.

Further, in the base station simulator 10 according to the present embodiment, the time domain is, for example, 14 symbols forming a predetermined slot in the frame configuration of the signal to be measured. With this configuration, the base station simulator 10 according to the present embodiment can grasp the reception status of the signal data of the signal to be measured for each symbol, and also grasps the abnormal part in symbol units when there is an abnormality.

Further, the base station simulator 10 according to the present embodiment has a configuration in which the data analysis unit 27c has a processing function of decoding the signal to be measured in units of code blocks (CB) of the symbol, the predetermined analysis item analyzed by the data analysis unit 27c is the decoding result of whether the decoding is successful or unsuccessful, and the decoding result is displayed for each CB on the analysis result display unit 28c.

With this configuration, the base station simulator 10 according to the present embodiment can grasp whether or not the signal data of the signal to be measured has been successfully decoded in units of CBs of the symbol, from a plurality of analysis results displayed side by side, and can specify the abnormal part in the CB unit of the symbol.

Further, in the base station simulator 10 according to the present embodiment, the predetermined analysis item is a constellation. With this configuration, the base station simulator 10 according to the present embodiment can roughly grasp the communication status of the signal data of the signal to be measured for each time domain, and can verify the communication status in more detail by further displaying the constellation in the desired time domain.

Further, in the base station simulator 10 according to the present embodiment, the predetermined analysis item is a frequency spectrum. With this configuration, the base station simulator 10 according to the present embodiment can roughly grasp the communication status of the signal data of the signal to be measured for each time domain, and can verify the communication status in more detail by further displaying the signal in the desired time domain.

Further, in the base station simulator 10 according to the present embodiment, the time domain is a slot, and the display control unit 20d displays the length of the symbol included in the slot. With this configuration, the base station simulator 10 according to the present embodiment can know the length (number) of symbols constituting the signal data of the signal to be measured, and can easily grasp the communication status for each symbol.

Further, the base station simulator 10 according to the present embodiment further includes a subcarrier interval setting unit 20e that sets the frequency interval of the subcarriers in the communication standard of the signal to be measured. Here, the communication standard of the signal to be measured is 5G NR, and the subcarrier interval setting unit 20e sets any value of 15 KHz, 30 KHz, KHz, or 120 KHz as the frequency interval of the subcarriers.

With this configuration, the base station simulator 10 according to the present embodiment can also support analysis of the signal data of the signal to be measured of 5G NR for each time domain, and grasp the reception status of the signal data of the signal to be measured for each time domain, even when the frequency interval of the subcarriers is either 15 KHz, 30 KHz, 60 KHz, or 120 KHz.

Further, the base station simulator 10 according to the present embodiment further includes a trigger detection unit 25 that outputs a trigger signal at a predetermined timing when a predetermined trigger condition is satisfied, and an IQ data memory unit 26 that receives a trigger signal and extracts the IQ data in the predetermined section corresponding to a predetermined timing from the signal data, and the data analysis unit 27c analyzes the signal data in the predetermined section extracted by the IQ data memory unit 26.

With this configuration, the base station simulator 10 according to the present embodiment can display the analysis results side by side obtained by analyzing only the signal data in a predetermined section satisfying the trigger conditions for each time domain and a plurality of analysis items, grasp the communication status of the signal data satisfying the trigger conditions for each time domain from the plurality of analysis results displayed side by side, and also specify the abnormal part in each time domain when there is an abnormality.

Further, the signal analysis result display method according to the present embodiment has a configuration to include a reception step (S12) of receiving a signal to be measured modulated by an OFDM method, a signal data calculation step (S13) of calculating signal data of the signal to be measured received in the reception step, an analysis step (S19) of analyzing the signal data for a predetermined analysis item for each time domain defined by the OFDM method, and calculating a plurality of analysis results corresponding to each time domain, and a display step (S20) of displaying the plurality of analysis results on the analysis result display unit 28c side by side.

With this configuration, the signal analysis result display method according to the present embodiment can grasp the communication status of the signal data of the signal to be measured for each time domain from the plurality of analysis results displayed side by side on the analysis result display unit 28c, and specify the abnormal part in each time domain when there is an abnormality.

Second Embodiment

Next, the configuration of a signal analysis device 1 according to a second embodiment of the present invention will be described with reference to FIG. 12.

Figure 12:
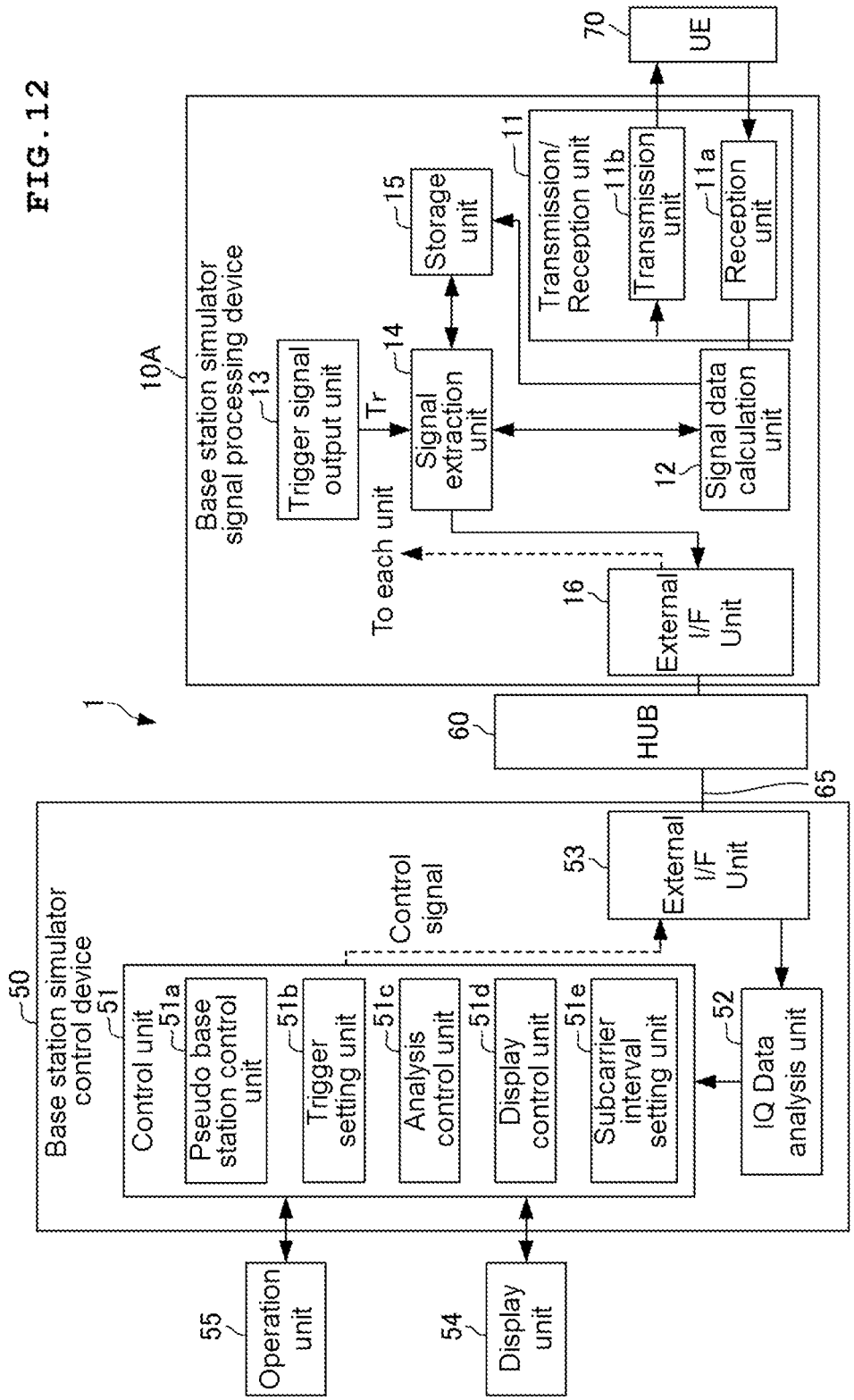
FIG. 12 is a block diagram showing a configuration of a signal analysis device according to a second embodiment of the present invention.

As shown in FIG. 12, the signal analysis device 1 according to the present embodiment has a system configuration in which a base station simulator signal processing device 10A and a base station simulator control device 50 are communicably connected via a hub 60. The base station simulator control device 50 is connected to the hub 60 by, for example, a network 65 using Ethernet (registered trademark).

The base station simulator signal processing device 10A has a conceptual configuration equivalent to that of the base station simulator 10 (see FIG. 1) according to the first embodiment, except for some functional blocks. The base station simulator signal processing device 10A according to the present embodiment operates as a base station simulator under the control of the base station simulator control device 50, and a pseudo base station control function unit that performs communication simulating a base station with the UE 70 (equivalent to the UE 70 in the first embodiment), a function unit that controls the analysis of IQ data, a function unit that displays the analysis result of IQ data, or the like are entrusted to the control functions of the base station simulator control device 50.

As shown in FIG. 12, the base station simulator signal processing device 10A includes a transmission/reception unit 11 having a reception unit 11a and a transmission unit 11b, a signal data calculation unit 12, a trigger signal output unit 13, a signal extraction unit 14, a storage unit 15, and an external interface (I/F) unit 16.

In the base station simulator signal processing device 10A, the reception unit 11a corresponds to the reception unit 21a of the base station simulator 10 according to the first embodiment. The signal data calculation unit 12 also corresponds to the analog signal processing unit 22 and the uplink layer processing unit 23. The trigger signal output unit 13 also corresponds to the trigger detection unit 25. The signal extraction unit 14 and the storage unit 15 also correspond to the IQ data memory unit 26. The external interface (I/F) unit 16 is interface means for transmitting and receiving signals to and from the hub 60.

The base station simulator control device 50 is composed of, for example, a computer device such as a personal computer (PC), and functions as a control PC that comprehensively controls various control operations of the base station simulator signal processing device 10A for testing the UE 70. As shown in FIG. 12, the base station simulator control device 50 includes a control unit 51, an IQ data analysis unit 52, an external interface (I/F) unit 53, a display unit 54, and an operation unit 55.

In the base station simulator control device 50, the control unit 51 has a control function equivalent to that of the control unit 20 of the base station simulator 10 according to the first embodiment. That is, the control unit 51 includes a pseudo base station control unit 51a, a trigger setting unit 51b, an analysis control unit 51c, a display control unit 51d, and a subcarrier interval setting unit 50e respectively equivalent to the pseudo base station control unit 20a, the trigger setting unit 20b, the analysis control unit 20c, the display control unit 20d, and the subcarrier interval setting unit 20e in the control unit 20 of the base station simulator 10 according to the first embodiment. Further, in the base station simulator control device 50, the IQ data analysis unit 52 is equivalent to the IQ data analysis unit 27 of the base station simulator 10 according to the first embodiment, and constitutes the analysis unit of the present invention. The display unit 54 and the operation unit 55 are equivalent to the display unit 28 and the operation unit 29, respectively. The external interface (I/F) unit 53 is interface means for transmitting and receiving signals to and from the hub 60 via the network 65.

In the signal analysis device 1 having the system configuration shown in FIG. 12, the base station simulator signal processing device 10A and the base station simulator control device 50 operate as follows, respectively. The reception unit 11a receives the signal to be measured transmitted from the UE 70 (see step S12 in FIG. 4). The signal data calculation unit 12 converts the signal to be measured into a digital signal and executes a process of calculating the signal data (see step S13 in FIG. 4). The trigger signal output unit 13 outputs a trigger signal at a predetermined timing when a predetermined trigger condition is satisfied (see step S17 in FIG. 4). Upon receiving the trigger signal, the signal extraction unit 14 extracts IQ data in a predetermined section according to a predetermined timing from the signal data calculated by the signal data calculation unit 12 (see step S18 in FIG. 4). Specifically, IQ data in a predetermined section is stored in the storage unit 15 composed of the ring buffer memory. Then, in the base station simulator control device 50, the IQ data analysis unit 52 executes an analysis process of IQ data in a predetermined section stored in the ring buffer memory (see step S19 in FIG. 4). Further, the display control unit 51d controls the display unit 54 to display the analysis result of the IQ data by the IQ data analysis unit 52 (see step S20 in FIG. 4).

In particular, in the signal analysis device 1, for the process of step S19, the IQ data analysis unit 52 analyzes the signal data in a predetermined section stored in the ring buffer memory in each time domain defined by the OFDM method for a predetermined analysis item, and calculates the analysis results of a plurality of analysis items corresponding to each time domain. Further, in the process of step S20, the display control unit 51d controls the display unit 54 to display the analysis results of the plurality of analysis items side by side (see step S23 in FIG. 7). This signal analysis and analysis result display processes are performed in the same manner as in the base station simulator 10 according to the first embodiment.

As described above, in the signal analysis device 1 according to the second embodiment, the base station simulator signal processing device 10A and the base station simulator control device 50 cooperate as a system to implement the IQ data analysis processing function and the analysis result display processing function similar to that of the single base station simulator 10 according to the first embodiment. That is, in the signal analysis device 1 according to the present embodiment, the signal analysis function of setting a trigger condition, outputting a trigger signal in a communication state satisfying the trigger condition, acquiring and analyzing IQ data in a predetermined range in the PHY layer, and calculating the analysis results of a plurality of analysis items corresponding to each time domain for each time domain defined by the OFDM method at this time, and the display control function of displaying the analysis results of the plurality of analysis items side by side on the display unit 54 are the same as the functions of the base station simulator 10 according to the first embodiment, respectively. Thus, the signal analysis device 1 according to the second embodiment can be expected to have the same effect as the effect of the base station simulator 10 according to the first embodiment.

Further, the signal analysis device 1 according to the present embodiment has a configuration in which the signal extraction unit 14 (IQ data memory unit) and the IQ data analysis unit 52 are connected by a wired cable. With this configuration, the signal analysis device 1 according to the present embodiment can connect the same type of signal analysis devices in parallel when the number of base stations further increases, and can cope with the case where the signals to be transmitted and received increase.

In each of the above embodiments, the operation mode of 5G NR is illustrated, but the present invention can also be applied to an operation mode in which 5G NR and LTE are mixed, or a future operation mode in which 5G NR and the next communication standard are mixed.

INDUSTRIAL APPLICABILITY

As described above, the signal analysis device and the signal analysis result display method according to the present invention have an effect capable of grasping the communication status of signal data of an input modulation signal for each time domain and specifying an abnormal part in units of time domains, and are useful in general for signal analysis devices and signal analysis result display methods that analyze a signal to be measured transmitted from a mobile terminal.

DESCRIPTION OF REFERENCE NUMERALS AND SIGNS

1 Signal analysis device
10 Base station simulator
10A Base station simulator signal processing device
11a Reception unit
12 Signal data calculation unit
13 Trigger signal output unit
14 Signal extraction unit
20d Display control unit
20e Subcarrier interval setting unit
21a Reception unit
22 Analog signal processing unit (signal data calculation unit)
25 Trigger detection unit (trigger signal output unit)
26 IQ data memory unit (signal extraction unit)
27c Data analysis unit (analysis unit)
28c Analysis result display unit (display unit)
41b "Spectrum_Rx0" tab (frequency spectrum)
41c "Conste_L0" tab (Constellation)
43b "Decode result" display area (analysis item, decoding result)
43c "PUSCH Code Black CRC result" display area (analysis result)
44 Spectrum display area (analysis result)
45 Time domain signal display area (analysis result)
46 "Constellation" display area (analysis result)
51e Subcarrier interval setting unit
52 IQ data analysis unit (analysis unit)
54 Display unit
70 UE (User Equipment: mobile terminal)

What is claimed is:
1. A signal analysis device comprising:
a receiver configured to receive a signal to be measured modulated by an Orthogonal Frequency Division Multiple Access (OFDM) method;
a processor connected to a memory that stores computer-executable instructions, the processor configured to:
calculate signal data of the signal to be measured received by the receiver;
analyze the signal data for a predetermined analysis item for each subframe slot in a time domain defined by the OFDM method, wherein each subframe slot in the time domain includes a plurality of symbols, and
calculate a plurality of analysis results corresponding to each subframe slot in the time domain, the analysis results including an indication of a portion of time domain signal power waveforms in which a decoding error has occurred; and
a display screen configured to display the plurality of analysis results for each subframe slot in the time domain side by side,
wherein the processor is configured to perform decoding the signal to be measured in units of code blocks (CB) of symbols forming a predetermined slot,
wherein the predetermined analysis item is a decoding result which indicates that the decoding of the signal is successful when the signal is successfully decoded and which indicates that the decoding of the signal is unsuccessful when the signal is not successfully decoded, and wherein the display screen is configured to display the decoding result for each code block.

2. The signal analysis device according to claim 1, wherein the predetermined analysis item is further displayed on the display screen, and the display screen is configured to display the plurality of analysis results corresponding to each subframe slot in the time domain of the predetermined analysis item, when the predetermined analysis item displayed on the display screen is selected.

3. The signal analysis device according to claim 1, wherein the time domain is symbols forming a predetermined slot.

4. The signal analysis device according to claim 1, wherein the predetermined analysis item is a constellation.

5. The signal analysis device according to claim 1, wherein the predetermined analysis item is a frequency spectrum.

6. The signal analysis device according to claim 1, wherein:

the time domain comprises subframe slots according to the OFDM method, and the display is configured to display a length of the plurality of symbols included in each subframe slot in the time domain.

7. The signal analysis device according to claim 1, wherein:

the processor is configured to set a frequency interval of subcarriers in a communication standard of the signal to be measured, the communication standard is 5G NR, and the processor is configured to set a value of 15 KHz, 30 KHz, 60 KHz, or 120 KHz as the frequency interval of the subcarriers.

8. The signal analysis device according to claim 1, further comprising:

a trigger signal output configured to output a trigger signal at a predetermined timing when a predetermined trigger condition is satisfied, wherein the processor is further configured to:
receive the trigger signal, and to extract IQ data in a predetermined section according to the predetermined timing from the signal data, and
analyze the extracted IQ data in the predetermined section.

9. The signal analysis device according to claim 2, wherein the time domain is symbols forming a predetermined slot.

10. The signal analysis device according to claim 2, wherein:

the processor is configured to decode the signal to be measured in units of code blocks (CB) of symbols forming a predetermined slot, the predetermined analysis item is a decoding result of whether the decoding is successful or unsuccessful, and the display screen is configured to display the decoding result for each code block.

11. The signal analysis device according to claim 2, wherein the predetermined analysis item is a constellation.

12. The signal analysis device according to claim 2, wherein the predetermined analysis item is a frequency spectrum.

13. The signal analysis device according to claim 2, wherein:

the processor is configured to set a frequency interval of subcarriers in a communication standard of the signal to be measured, the communication standard is 5G NR, and the processor is configured to set a value of 15 KHz, 30 KHz, 60 KHz, or 120 KHz as the frequency interval of the subcarriers.

14. The signal analysis device according to claim 2, further comprising:

a trigger signal output configured to output a trigger signal at a predetermined timing when a predetermined trigger condition is satisfied, wherein the processor is further configured to:
receive the trigger signal, and to extract IQ data in a predetermined section according to the predetermined timing from the signal data, and
analyze the extracted IQ data in the predetermined section.

15. A signal analysis result display method comprising:

a reception step of receiving a signal to be measured modulated by an OFDM method;

a signal data calculation step of calculating signal data of the signal to be measured received in the reception step;

an analysis step of analyzing the signal data for a predetermined analysis item for each subframe slot in a time domain defined by the OFDM method, wherein each subframe slot in the time domain includes a plurality of symbols, and calculating a plurality of analysis results corresponding to each subframe slot in the time domain, the analysis results including an indication of a portion of time domain signal power waveforms in which a decoding error has occurred; and a display step of displaying the plurality of analysis results for each subframe slot in the time domain on a display screen in the time domain side by side, wherein a processor performs decoding the signal to be measured in units of code blocks (CB) of symbols forming a predetermined slot, wherein the predetermined analysis item is a decoding result which indicates that the decoding of the signal is successful when the signal is successfully decoded and which indicates that the decoding of the signal is unsuccessful when the signal is not successfully decoded, and wherein a display screen displays the decoding result for each code block.

\* \* \* \* \*